(12) United States Patent
Yang et al.

(10) Patent No.: US 10,737,393 B2
(45) Date of Patent: *Aug. 11, 2020

(54) GUIDANCE ROBOT

(71) Applicant: LG ELECTRONICS INC., Seoul (KR)

(72) Inventors: Sunho Yang, Seoul (KR); Haemin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

This patent is subject to a terminal disclaimer.

(21) Appl. No.: 15/853,533

(22) Filed: Dec. 22, 2017

(65) Prior Publication Data

US 2018/0178390 A1 Jun. 28, 2018

(30) Foreign Application Priority Data

Dec. 23, 2016 (KR) .................. 10-2016-0178602
Jul. 5, 2017 (KR) .................. 10-2017-0085353

(51) Int. Cl.
*B25J 13/08* (2006.01)
*B25J 9/16* (2006.01)
(Continued)

(52) U.S. Cl.
CPC ............ *B25J 9/1697* (2013.01); *B25J 5/007* (2013.01); *B25J 9/0003* (2013.01); *B25J 9/0009* (2013.01);
(Continued)

(58) Field of Classification Search
CPC ........ B25J 9/1697; B25J 5/007; B25J 9/0003; B25J 9/0009; B25J 11/008; B25J 19/00; B25J 19/02; B25J 9/126; B25J 9/1689; B25J 13/08; B06K 7/1413; G06K 7/1417; G06F 19/3418; G06F 3/011; G06F 3/04815; G06Q 30/0269; H04W 4/70

See application file for complete search history.

(56) References Cited

U.S. PATENT DOCUMENTS 6,920,376 B2 * 7/2005 Jouppi ................ G06F 3/04815
                                                      348/159
7,164,969 B2 * 1/2007 Wang ........................ B25J 5/007
                                                      700/245
(Continued)

FOREIGN PATENT DOCUMENTS

CN     105034002     11/2015
EP     1 932 632     6/2008
(Continued)

OTHER PUBLICATIONS

Ignatiev et al. Autonomous omni-wheeled mobile robots, 2016, IEEE, p. 1-4 (Year: 2016).*

(Continued)

*Primary Examiner* — McDieunel Marc
(74) *Attorney, Agent, or Firm* — Ked & Associates, LLP

(57) ABSTRACT

A guidance robot includes an internal frame, a shell over the internal frame and a display device provided outside of the shell and mounted to the frame. A reader is provided inside the shell, and an object having a readable code is inserted through an opening provided on the display device until the readable code is provided at the reader inside the shell.

20 Claims, 21 Drawing Sheets

(51) Int. Cl.

| | |
|---|---|
| *B25J 5/00* | (2006.01) |
| *B25J 19/00* | (2006.01) |
| *B25J 11/00* | (2006.01) |
| *B25J 9/00* | (2006.01) |
| *B25J 19/02* | (2006.01) |
| *G06K 7/14* | (2006.01) |

(52) U.S. Cl.
CPC .............. *B25J 11/008* (2013.01); *B25J 13/08* (2013.01); *B25J 19/00* (2013.01); *B25J 19/02* (2013.01); *G06K 7/1413* (2013.01); *G06K 7/1417* (2013.01)

(56) References Cited

U.S. PATENT DOCUMENTS

| | | | |
|---|---|---|---|
| 7,171,286 B2* | 1/2007 | Wang | G06F 19/3418 |
| | | | 700/248 |
| 8,265,793 B2* | 9/2012 | Cross | H04W 4/70 |
| | | | 700/259 |
| 9,720,414 B1 | 8/2017 | Theobald | |
| 2003/0028993 A1 | 2/2003 | Song | |
| 2005/0171636 A1 | 8/2005 | Tani | |
| 2005/0219356 A1 | 10/2005 | Smith et al. | |
| 2005/0277477 A1 | 12/2005 | Hajder et al. | |
| 2007/0143187 A1 | 6/2007 | Gottfurcht | |
| 2007/0150094 A1 | 6/2007 | Huang | |
| 2007/0192910 A1 | 8/2007 | Vu et al. | |
| 2008/0154488 A1 | 6/2008 | Silva et al. | |
| 2009/0173561 A1 | 7/2009 | Moriguchi et al. | |
| 2010/0094459 A1 | 4/2010 | Cho et al. | |
| 2010/0180709 A1 | 7/2010 | Choi et al. | |
| 2013/0221101 A1 | 8/2013 | Lebaschi et al. | |
| 2015/0148951 A1 | 5/2015 | Jeon et al. | |
| 2016/0171303 A1 | 6/2016 | Moore et al. | |
| 2017/0011258 A1 | 1/2017 | Pitre et al. | |
| 2017/0075962 A1 | 3/2017 | Hitchcock et al. | |
| 2017/0129602 A1 | 5/2017 | Alduaiji et al. | |
| 2017/0221130 A1 | 8/2017 | Kraus et al. | |
| 2018/0009108 A1 | 1/2018 | Yamamoto et al. | |
| 2018/0178375 A1* | 6/2018 | Yang | B25J 9/0003 |
| 2018/0178377 A1* | 6/2018 | Yang | B25J 19/00 |
| 2018/0192845 A1 | 7/2018 | Gu | |
| 2019/0005545 A1* | 1/2019 | Roh | G06Q 30/0269 |
| 2019/0107833 A1 | 4/2019 | Song et al. | |

FOREIGN PATENT DOCUMENTS

| | | |
|---|---|---|
| EP | 2 025 478 | 2/2009 |
| JP | 2002-355779 | 12/2002 |
| JP | 2004-017200 | 1/2004 |
| JP | 2005-172879 | 6/2005 |
| JP | 2007-229817 | 9/2007 |
| JP | 2017-097207 | 6/2017 |
| KR | 10-0916493 | 9/2009 |
| KR | 10-2009-0128637 | 12/2009 |
| KR | 10-2010-0006975 | 1/2010 |
| KR | 10-2012-0111519 | 10/2012 |
| KR | 10-1193610 | 10/2012 |
| KR | 10-1243262 | 3/2013 |
| KR | 20-0481042 | 8/2016 |
| WO | WO 2007/041295 | 4/2007 |
| WO | WO 2016/094013 | 6/2016 |

OTHER PUBLICATIONS

Lemburg et al., AILA—design of an autonomous mobile dual-arm robot, 2011, IEE, p. 5147-5153 (Year: 2011).*
Hebert et al., Supervised Remote Robot with Guided Autonomy and Teleoperation (SURROGATE): A framework for whole-body manipulation, 2015, IEEE, p. 5509-5516 (Year: 2015).*
Zhang et al., A networked teleoperation system for mobile robot with wireless serial communication, 2009, IEEE, p. 2227-2231 (Year: 2009).*
United States Office Action dated Sep. 13, 2019 issued in U.S. Appl. No. 15/853,409.
Minute Explained: "R2-D2's Tools Explained! The Ultimate Intergalactic Swiss Army Knife"; https://www.youtube.com/watch?v-ejwVwqUV4LA retrieved on May 7, 2018 (XP-054978324).
European Search Report dated May 17, 2018 issued in Application No. 17209452.6.
European Search Report dated May 18, 2018 issued in Application No. 17209458.3.
European Search Report dated May 23, 2018 issued in Application No. 17209459.1.
U.S. Appl. No. 15/853,409, filed Dec. 22, 2017, William J. Kelleher.
U.S. Appl. No. 15/853,587, filed Dec. 22, 2017, Khoi H. Tran.
U.S. Appl. No. 15/936,814, filed Mar. 27, 2018, Kimberly S. Berona.
U.S. Appl. No. 16/020,579, filed Jun. 27, 2018, Jelani A. Smith.
U.S. Office Action dated Oct. 7, 2019 issued in U.S. Appl. No. 16/020,579.
European Search Report dated Sep. 7, 2018 issued in EP Application No. 18164322.2.
U.S. Office Action dated Apr. 19, 2019 issued in co-pending related U.S. Appl. No. 16/020,579.
U.S. Office Action dated Dec. 26, 2019 issued in U.S. Appl. No. 15/936,814.
United States Office Action dated Feb. 21, 2020 issued in U.S. Appl. No. 15/853,409.
Zhang et aI., A networked teleoperation system for mobile robot with wireless serial communication, 2009, IEEE, p. 2227-2231 (Year: 2009).
Lemburg et aI., AILA—design of an autonomous mobile dual-arm robot, 2011, IEE, p. 5147-5153 (Year: 2011).
United States Office Action dated Jan. 3, 2020 issued in U.S. Appl. No. 15/853,587.
United States Office Action dated Mar. 4, 2020 issued in U.S. Appl. No. 16/020,579.
U.S. Appl. No. 16/539,867, filed Aug. 13, 2019.
U.S. Appl. No. 15/853,409, filed Dec. 22, 2017.
U.S. Appl. No. 15/853,587, filed Dec. 22, 2017.
U.S. Appl. No. 15/936,814, filed Mar. 27, 2018.
U.S. Appl. No. 16/020,579, filed Jun. 27, 2018.
European Search Report dated Nov. 16, 2018 issued in Application No. 18177444.9.
Korean Office Action dated Dec. 6, 2018 issued in KR Application No. 10-2017-0085353.
Korean Office Action dated Dec. 7, 2018 issued in KR Application No. 10-2017-0085368.

* cited by examiner

GUIDANCE ROBOT

CROSS-REFERENCE TO RELATED APPLICATIONS

This application claims priority under 35 U.S.C. § 119 and § 35 U.S.C. 365 to Korean Patent Application No. 10-2016-0178602 filed on Dec. 23, 2016 and Korean Patent Application No. 10-2017-0085353 filed on Jul. 5, 2017, whose entire disclosures are hereby incorporated by reference.

BACKGROUND

1. Field

The present disclosure relates to a guidance robot.

2. Background

In recent years, functions of robots have been expanded due to development of the deep learning technology, the autonomous driving technology, the automatic control technology, the Internet of things, and the like.

The deep learning technology corresponds to one field of machine learning. The deep learning technology is a technology in which programs make similar determinations on various situations rather than confirming conditions and setting commands in advance. A computer may perform thinking similarly to a human brain, and may analyze a vast amount of data.

In the autonomous driving technology, a machine by itself may determine a current location to move and avoid an obstacle. A robot may autonomously recognize a location through a sensor, to move and avoid an obstacle.

In the automatic control technology, a machine automatically controls its operation based on feed feeding back of a measured value obtained by checking a state of the machine. The automatic control technology may perform a control without manipulation by a user, and may perform an automatic adjustment such that an object to be controlled arrives at a target range, that is, a target value.

The Internet of Things (IoT) refers to an intelligent technology and service of communicating information between people and things and between things by connecting all things based on the Internet. Devices connected to the Internet transmit and receive information without help of a person, and autonomously communicate with each other.

An intelligent robot may be implemented due to development and fusion of the above-described technologies, and various information elements and services may be provided through the intelligent robot.

A robot may be generally classified into an industrial robot, a medical robot, a space robot, and a submarine robot. For example, in the mechanical processing industry such as automobile production, the robot may perform repeated operations. Many industrial robots may repeatedly perform the same operation, after a user teaches once, work which is usually performed by a person's arm.

A traffic guidance intelligent robot capable of autonomous driving is disclosed in Korean Patent No. 10-1193610 dated Oct. 26, 2012. A robot which avoids an obstacle while being autonomously driven on a crosswalk for traffic guidance is disclosed.

The robot may include a driving unit, a body, an arm, and a head, and an image and voice recognition unit is provided in the head. The robot may determine a face of a person by photographing a long-distance image or a short-distance image through the image and voice recognition unit.

The robot according to the related art merely senses the face of the person by using a camera sensor, but it may not be possible to recognize an object owned by the user, for example, a barcode represented on a boarding pass, or the like. Thus, there is a limit in providing a rapid and accurate route guidance service to the user having the boarding pass in a public place such as an airport where user density is high.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

Figure 1:
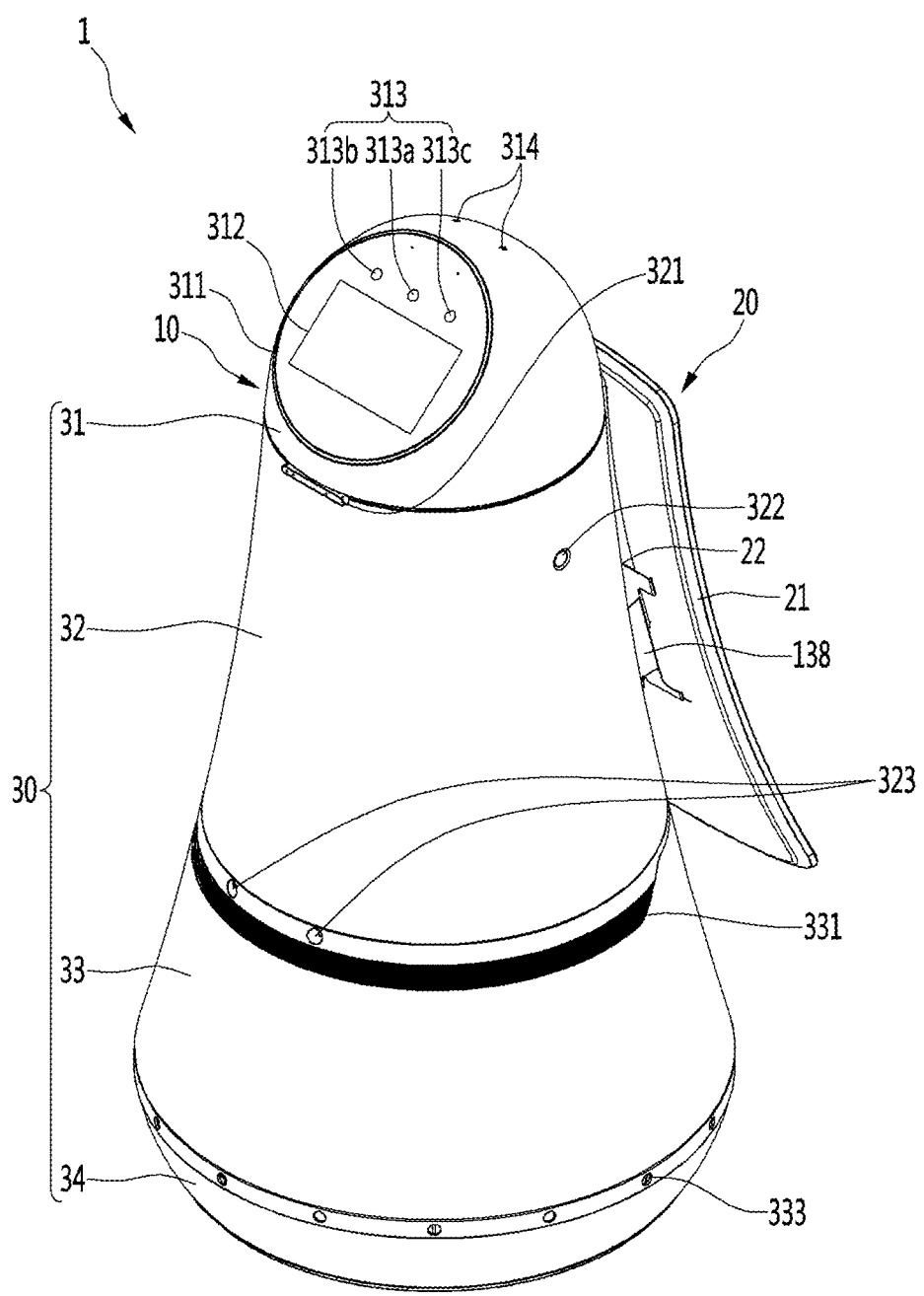
FIG. 1 is a perspective view illustrating a guidance robot according to a first embodiment of the present disclosure.
Figure 2:
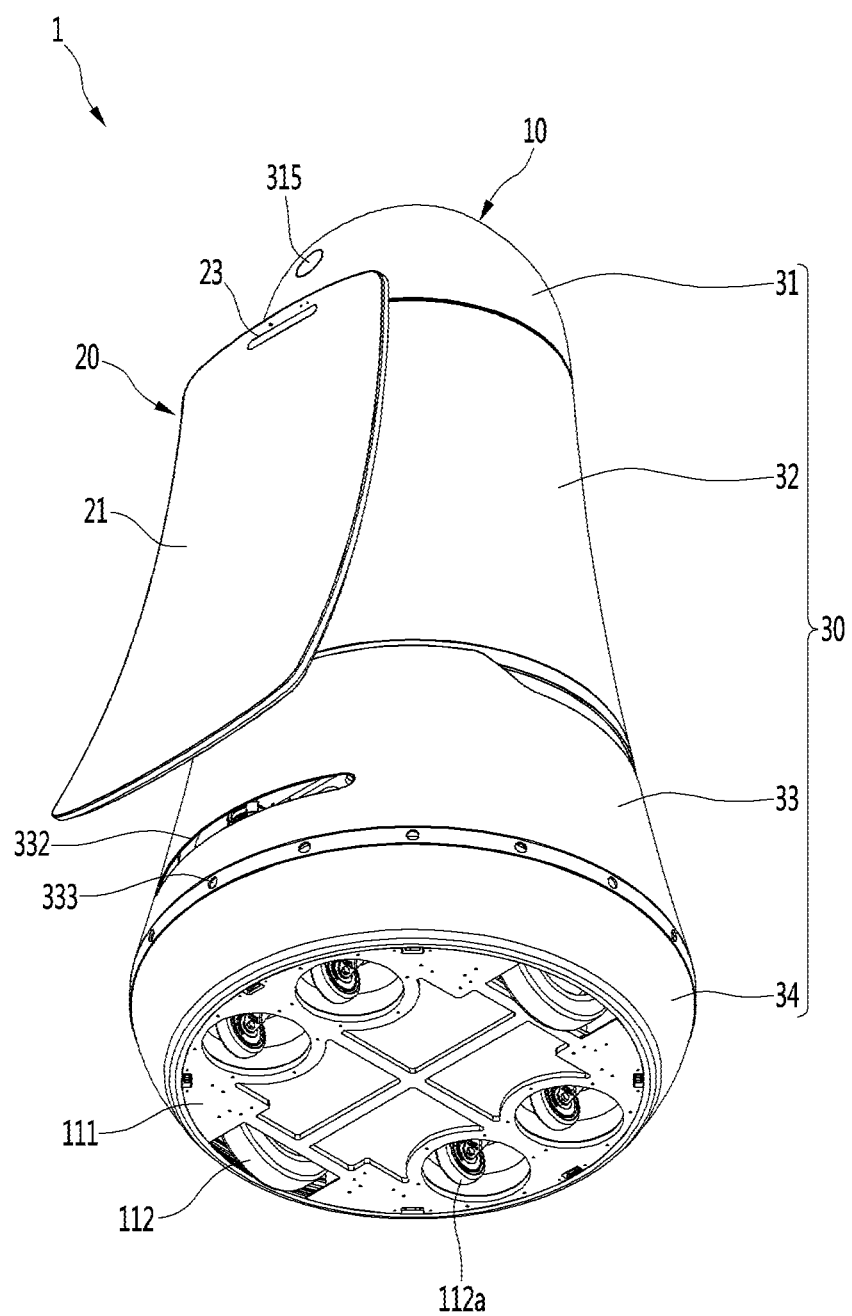
FIG. 2 is a bottom perspective view illustrating the guidance robot when viewed from the bottom.
Figure 3:
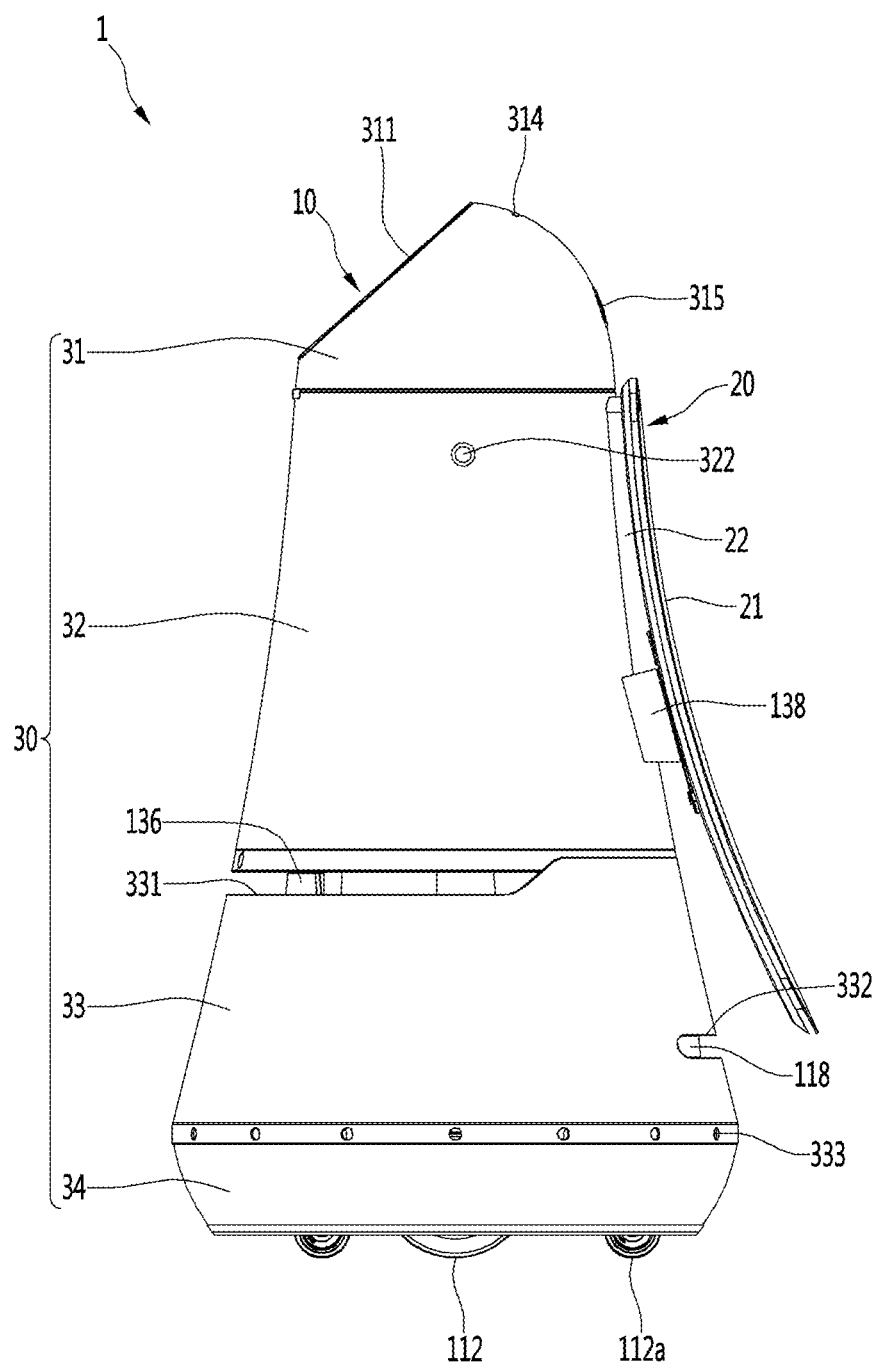
FIG. 3 is a side view illustrating the guidance robot.
Figure 4:
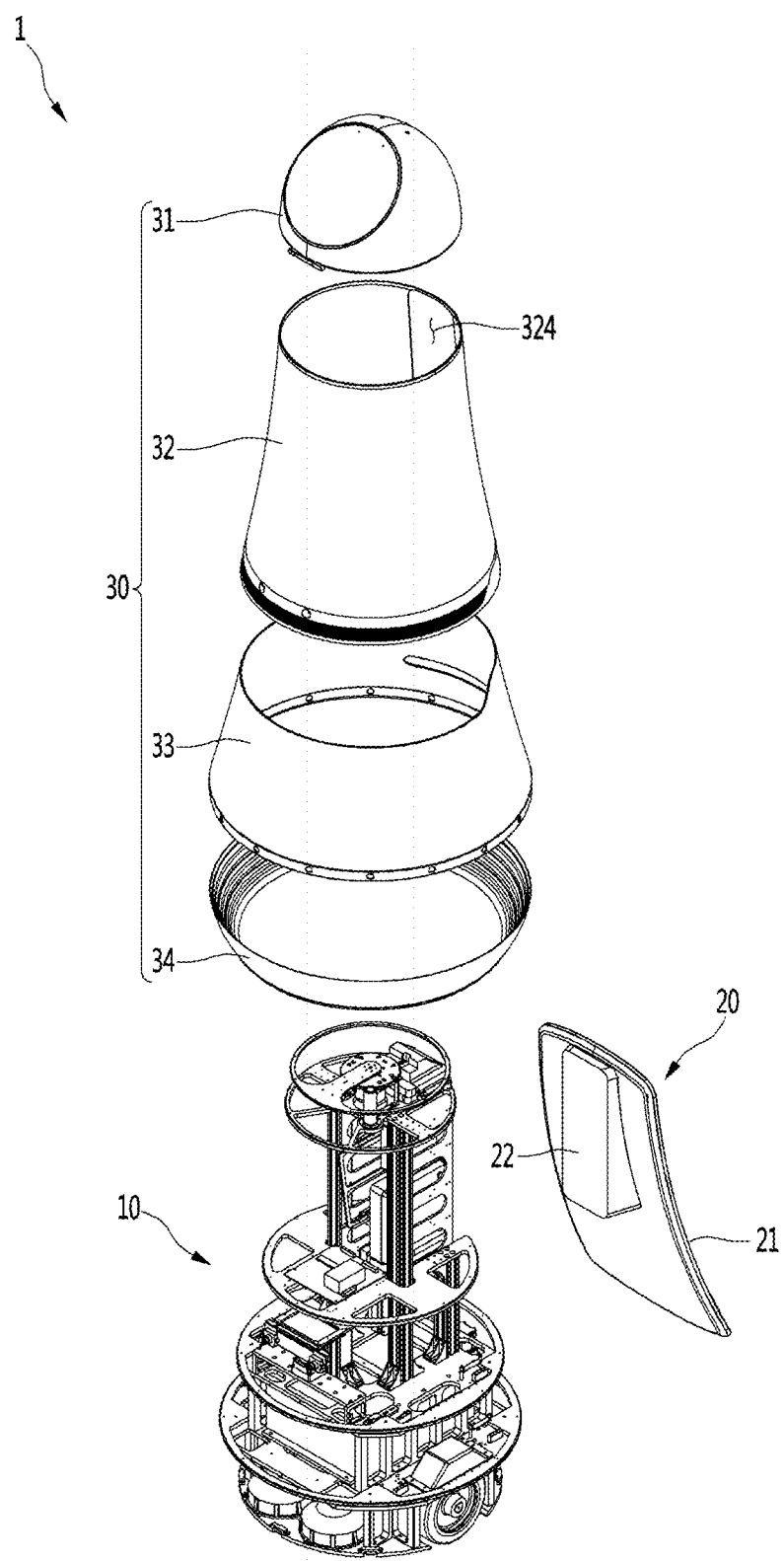
FIG. 4 is an exploded perspective view illustrating the guidance robot.

The guidance robot according to the present disclosure may provide a route guidance service to a user in a public, private, or commercial place. The guidance robot may be driven in one direction or the other direction along a predetermined driving route.

Referring to FIGS. 1 to 4, a guidance robot 1 according to the present disclosure may include a body 10 and a display unit 20. The body may vertically extend, and may have a roly poly shape which becomes slimmer as it goes from a lower portion to an upper portion as a whole. The body 10 may include a case 30 defining an outer appearance of the guidance robot 1.

The case 30 may include a top cover 31 arranged on an upper side of the case 30, a first middle cover 32 arranged below the top cover 31, a second middle cover 33 arranged below the first middle cover 32, and a bottom cover arranged below the second middle cover 33. The first middle cover 32 and the second middle cover 33 may be named a "middle cover".

The top cover 31 may be located at the uppermost end of the guidance robot 1, and may have a hemispheric shape or a dome shape. The top cover 31 may be located at a height (for example, 132 to 152 cm) that is lower than a height of an adult to easily receive input or a command from the user. Further, the top cover 31 may have a tilted surface of a predetermined angle.

The top cover 31 may include a manipulation unit 311 on one side of the front surface thereof. The manipulation unit or a user interface 311 may function to receive input of a command from the user. The manipulation unit 311 may include a touch monitor 312 configured to receive a touch input from the user. The touch monitor 312 may include a touch panel configured to receive input of the user, and a monitor to display information.

The manipulation unit 311 may face the upper side at a specific angle such that the user may easily manipulate the touch monitor 312 while looking down the touch monitor 312. For example, the manipulation unit 311 may be arranged on a surface formed by cutting a portion of the top cover 31 or pre-formed holes. The touch monitor 312 may be inclined.

A direction in which the manipulation unit 311 faces with reference to FIG. 1 is defined as a "front side". Further, an opposite direction to the manipulation unit 311, that is, a direction in which the display unit 20 faces, is defined as a "rear side".

The manipulation unit 311 may further include an object recognition sensor 313. The object recognition sensor 313 may be arranged on an upper side of the touch monitor 312. The object recognition sensor 313 may include a 2D camera 313a and RGBD sensors 313b and 313c. The 2D camera 313a may be a sensor configured to recognize a person or an object based on a 2D image.

The RGBD sensors 313b and 313c may be sensors configured to acquire a location or a facial image of a person. The RGBD sensors 313b and 313c may be sensors configured to detect a person or an object by using captured images having depth data, which are acquired by a camera having RGBD sensors or another similar 3D imaging device.

The plurality of RGBD sensors 313b and 313C may be configured to accurately detect the location or the facial image of the person. For example, the two RGBD sensors 313b and 313c may be configured, and may be arranged on the left side and the right side of the 2D camera 313a, respectively. Although not illustrated, the manipulation unit 311 may further include a physical button configured to directly receive input of a command from the user. The top cover 31 may further include microphones 314. The microphones 314 may function to receive input of a command of an audio signal from the user. For example, the microphones 314 may be formed at four points at an upper end of the top cover 31 to accurately receive a voice command from the user. Thus, even when the guidance robot 1 is driven or the top cover 31 is rotated, a vocal route guidance request may be accurately received from the user.

In the present embodiment, the top cover 31 may be rotated such that the manipulation unit 311 faces a driving direction while the guidance robot 1 is driven. Further, the top cover 31 may be rotated such that the manipulation unit 311 faces a location in which the user is located, when the guidance robot 1 receives a command (for example, a voice command, and the like) from the user while being driven.

Dissimilar to this, the top cover 31 may be rotated in an opposite direction to the driving direction of the guidance robot 1 when the guidance robot 1 receives a command from the user while being driven. The top cover 31 may be rotated toward the display unit 20, and the user may effectively manipulate the manipulation unit 311 while viewing route guidance service information displayed on the display unit 20.

Meanwhile, in a state in which the guidance robot 1 is driven or stopped, a direction to which the manipulation unit 311 is directed and a direction to which the display unit 20 is directed may be opposite to each other. In this case, for example, because the manipulation unit 311 faces one direction, and the display unit 20 may face an opposite direction to the one direction, there is an advantage in that information displayed on the manipulation unit 311 or the display unit 20 may be viewed in opposite directions.

The top cover 31 may further include an emergency manipulation button 315. The emergency manipulation button 315 may function to immediately stop an operation of the guidance robot 1 while the guidance robot 1 is stopped or driven. For example, the emergency manipulation button 315 may be located on a rear side of the guidance robot 1 such that the user may easily manipulate the emergency manipulation button 315 even when the guidance robot 1 is driven toward the front side.

The first middle cover 32 may be located below the top cover 31. Various electronic components including a substrate for electronic components may be located inside the first middle cover 32. The first middle cover 32 may have a cylindrical shape, a diameter of which is increased as it goes from the upper side to the lower side.

The first middle cover 32 may include an RGBD sensor 321. The RGBD sensor 321 may function to detect collision between the guidance robot 1 and an obstacle while the guidance robot 1 is driven. The RGBD sensor 321 may be located in a direction in which the guidance robot 1 is driven, that is, on a front side of the first middle cover 32. As an example, the RGBD sensor 321 may be located at an upper end of the first middle cover 32 in consideration of the height of the obstacle or the person existing on the front side of the guidance robot 1. However, although the present disclosure is not limited thereto, the RGBD sensor 321 may be arranged at various locations on the front side of the first middle cover 32.

The first middle cover 32 may further include a speaker hole 322. The speaker hole 322 may be a hole for transferring a sound generated by a speaker to the outside. One speaker hole 322 may be formed on a peripheral surface of the first middle cover 32. However, a plurality of speaker holes 322 may be formed on the peripheral surface of the first middle cover 32 to be spaced apart from each other.

Figure 5:
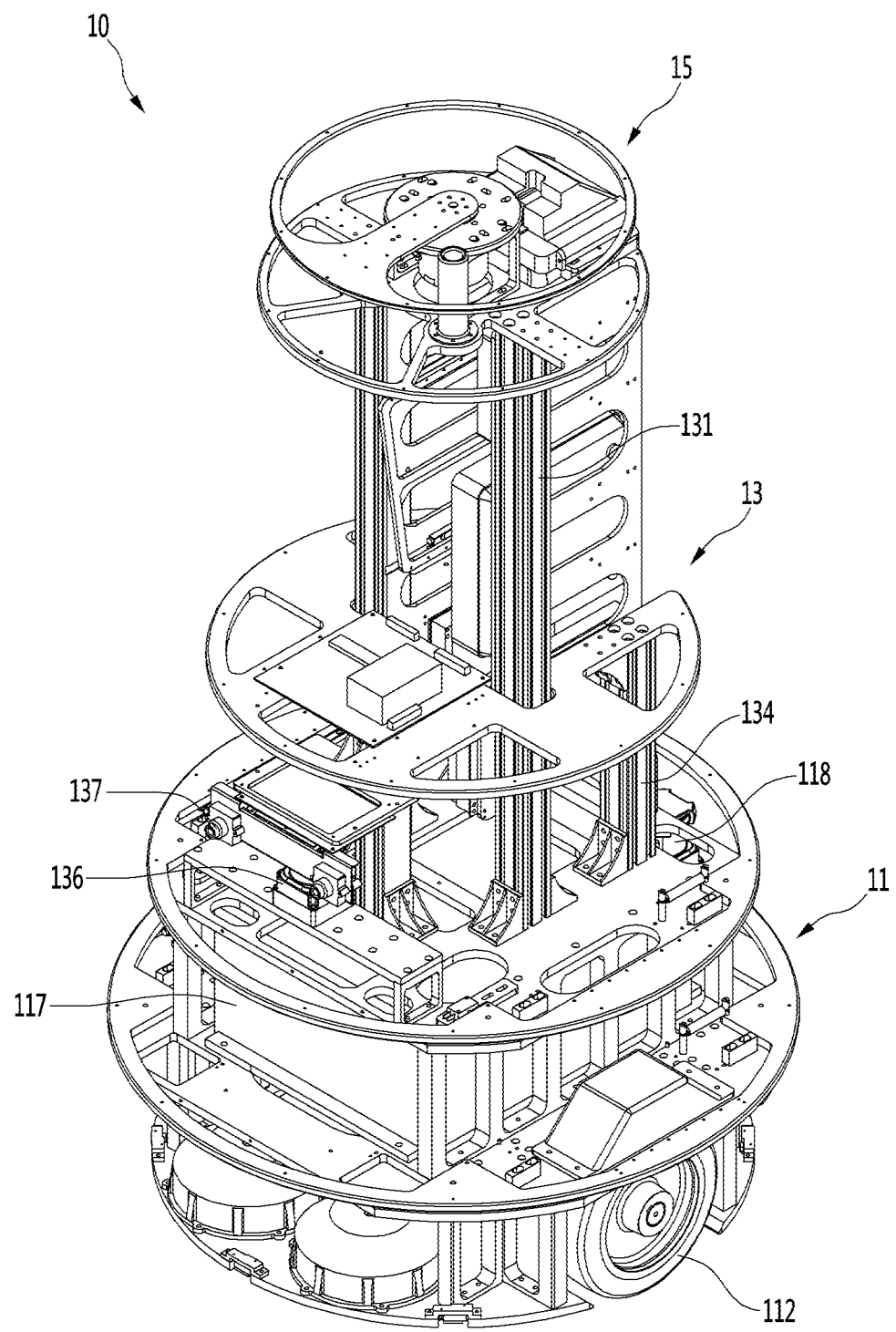
FIG. 5 is a perspective view illustrating a body of the guidance robot.

The first middle cover 32 may further include a stereo camera hole 323. The stereo camera hole 323 may be a hole for an operation of a stereo camera (indicated by reference numeral 137 of FIG. 5) installed inside the body 10. As an example, the stereo camera hole 323 may be formed at a lower end of the front side of the first middle cover 32. Accordingly, the stereo camera 137 may photograph a front area of the guidance robot 1 through the stereo camera hole 323.

The second middle cover 33 may be located below the first middle cover 32. A battery, a lidar for autonomous driving, and the like may be located inside the second middle cover 33. The second middle cover 32 may have a cylindrical shape, a diameter of which is increased as it goes from the upper side to the lower side, which is like the first middle cover 32. Further, the outside of the second middle cover 33 may be connected to the outside of the first middle cover 32 without a step. Because the outside of the second middle cover 33 and the outside of the first middle cover 32 may be smoothly connected to each other, an outer appearance may be more aesthetically pleasing.

Further, the first middle cover 32 and the second middle cover 33 may have cylindrical shapes, diameters of which are increased as they go from the upper side to the lower side, and thus, may have a roly poly shape as a whole. When the body 10 collides with the person or the obstacle, a generated impact may be reduced.

The second middle cover 33 may include a first cutout 331 or first opening. The first cutout 331 may be formed from the front side to the lateral sides of a peripheral surface of the second middle cover 33. The first cutout 331 is a portion that is cut from the second middle cover 33 such that a front lidar 136, which will be described below, may be operated. Alternatively, the cutout may be an opening made during fabrication.

In detail, the first cutout 331 may be radially cut in a predetermined length from a front outer peripheral surface of the second middle cover 33. The front lidar 136 may be located inside the second middle cover 33. Further, the first cutout 331 may be formed on the peripheral surface of the second middle cover 33, which corresponds to a position of the front lidar 136, by cutting a periphery of the second middle cover 33. The first cutout 331 and the front lidar 136 may face each other, and the front lidar 136 may be exposed to the outside through the first cutout 331.

As an example, the first cutout 331 may be cut from the front side of the second middle cover 33 along the periphery of the second middle cover 33 by 270 degrees. The first cutout 331 is formed in the second middle cover 33 to prevent a laser beam emitted from the front lidar 136 from being directly irradiated to eyes of an adult or a child.

The second middle cover 33 may further include a second cutout 332 or a second opening. The second cutout 332 may be formed from the rear side to the lateral sides of the peripheral surface of the second middle cover 33. The second cutout 332 is a portion that is cut from the second middle cover 33 such that a rear lidar 118, which will be described below, may be operated.

The second cutout 332 may be radially cut in a predetermined length from a rear outer peripheral surface of the second middle cover 33. The rear lidar 118 may be located inside the second middle cover 33. The second cutout 332 may be formed at a point which corresponds to a location of the rear lidar 118 by cutting the periphery of the second middle cover 33, and the rear lidar 118 may be exposed to the outside through the second cutout 332. As an example, the second cutout 332 may be cut from the rear side of the second middle cover 33 along the periphery of the second middle cover 33 by 130 degrees. Alternatively, a second opening corresponding to the second cutout 332 may be made during the fabrication of the second middle cover 33.

In the present embodiment, the first cutout 331 may be vertically spaced apart from the second cutout 332 so as not to be connected to the second cutout 332. Further, the first cutout 331 may be located above the second cutout 332.

If the first cutout 331 and the second cutout 332 are located on the same line, a laser beam emitted from a lidar of one guidance robot may be irradiated to a lidar of another guidance robot. Because the laser beams emitted from the lidars of the guidance robots interfere with each other, it is difficult to detect an accurate distance. Because it is not possible to detect a distance between the guidance robot and an obstacle, there is a problem in that it is difficult to perform normal driving, and the guidance robot and the obstacle may collide with each other.

The second middle cover 33 may further include ultrasonic sensors 333. The ultrasonic sensors 333 may be a sensor configured to measure a distance between an obstacle and the guidance robot 1 using an ultrasonic signal. The ultrasonic sensors 333 may function to detect an obstacle that is adjacent to the guidance robot 1. As an example, the plurality of ultrasonic sensor 333 may be configured to detect obstacles that are adjacent to the guidance robot 1 in all directions. Further, the plurality of ultrasonic sensors 333 may be located along a lower periphery of the second middle cover 33 to be spaced apart from each other.

The bottom cover 34 may be located below the second middle cover 33. Wheels 112, casters 112a, and the like may be located inside the bottom cover 34. The bottom cover 34 may have a cylindrical shape, a diameter of which is decreased as it goes from the upper side to the lower side, which is dissimilar to the first middle cover 32 and the second middle cover 33. The body 10 may have a roly poly shape as a whole, so that an impulse applied when a robot collides may be reduced, and a lower end of the body 10 has an inward-depressed structure, so that a foot of a person may be prevented from being caught by wheels of the robot.

A base 111 may be located inside the bottom cover 34. The base 111 may define the bottom surface of the guidance robot 1. Further, the wheels 112 for driving of the guidance robot 1 may be provided in the base 111. One wheel 112 may be located on each of the left and right sides of the base 111.

The casters 112a for assisting the driving of the guidance robot 1 may be provided in the base 111. The plurality of casters 112a may be configured to manually move the guidance robot 1. As an example, two casters 112a may be located on each of the front and rear sides of the base 111.

According to the above-described structure of the casters 112a, there is an advantage in that when the guidance robot 1 is switched off or the guidance robot 1 should be manually moved, the guidance robot 1 may be pushed and moved without applying a large force.

The display unit 20 may vertically extend from one side of the guidance robot 1. The display unit 20 may include a curved display 21.

The curved display 21 may be located on a rear side of the first middle cover 32. The curved display 21 may function to output visual information (for example, airport gate inquiry information, route guidance service information, and the like) related to a service being currently provided.

Further, the curved display 21 may have a shape that is outwards curved at a predetermined curvature. The curved display 21 may have a generally concave shape. The curved display 21 may have a shape that is further inclined rearward as it goes from the upper side to the lower side. In other words, the curved display 21 may become farther away from the case 30 as it goes from the upper side to the lower side.

According to the above-described structure of the display unit 20, there is an advantage in that information displayed on the curved display 21 is seen well even at a location that is far from the guidance robot, and the information displayed on the curved display 21 is seen even at various angles without distortion as well.

The guidance robot 1 may move along a predetermined path to guide the user through a way. Further, the user may view the display unit 20 installed on the rear side of the guidance robot 1 while following the guidance robot 1. Even when the guidance robot 1 is driven for route guidance, the user may easily view information displayed on the display unit 20 while following the guidance robot 1.

Further, an upper end of the curved display 21 may extend to an upper end of the first middle cover 32, and a lower end of the curved display 21 may extend to the second cutout 332. In the present embodiment, the lower end of the curved display 21 may be formed so as not to further extend from the second cutout 332. When the curved display 21 covers the second cutout 332, the laser beam emitted from the rear lidar 118 strikes the lower end of the curved display 21. Accordingly, a problem may occur in which the guidance robot 1 cannot detect a distance between the guidance robot 1 and a rear obstacle.

Further, the display unit 20 may further include a support part 22 or display support. The support part 22 may function to support the curved display 21 such that the curved display 21 is located on the rear side of the first middle cover 32. The support part 22 may extend from the rear surface of the curved display 21. The support part 22 may vertically extend from the rear surface of the curved display 21, and may further protrude as it goes from the upper side to the lower side.

Further, the support part 22 may be inserted into the first middle cover 32 through the rear side of the first middle cover 32. An opening 324 through which the support part 22 may pass may be formed on the rear side of the first middle cover 32. The opening 324 may be formed by cutting a portion of the rear side of the peripheral surface of the first middle cover 32 or pre-made during fabrication.

In the present disclosure, the opening 324 is formed to face a barcode or a QR code recognition hole 23 (hereinafter, referred as "bar code recognition hole") formed in the display unit 20, which will be described below. Thus, an object inserted through the barcode recognition hole 23 may be inserted into a barcode reader 40, which will be described below, through the opening 324.

Further, the display unit 20 may be fixed to an inside of the body 10 through a separate fixing member 138. In detail, the fixing member 138 configured to fix the display unit 20 to the body 10 may be provided inside the body 10. One side of the fixing member 138 may be fixed to the body, and the other side of the fixing member 138 may be fixed to the display unit 20. To this end, the other side of the fixing member 138 may protrude to the outside of the case 30 through the opening 324. That is, the support part 22 and the fixing member 138 may be located inside the opening 324 together.

In the present embodiment, the display unit 20 may be fastened to the fixing member 138 through a fastening unit. At this time, the support part 22 of the display unit 20 may be seated on the fixing member 138. In other words, the display unit 20 may be seated on the fixing member 138, and a portion of the fixing member 138 may be fixed to a portion of the display unit 20. According to such a fixing structure of the display unit 20, the display unit 20 may be stably located on the rear side of the first middle cover 32.

Figure 7:
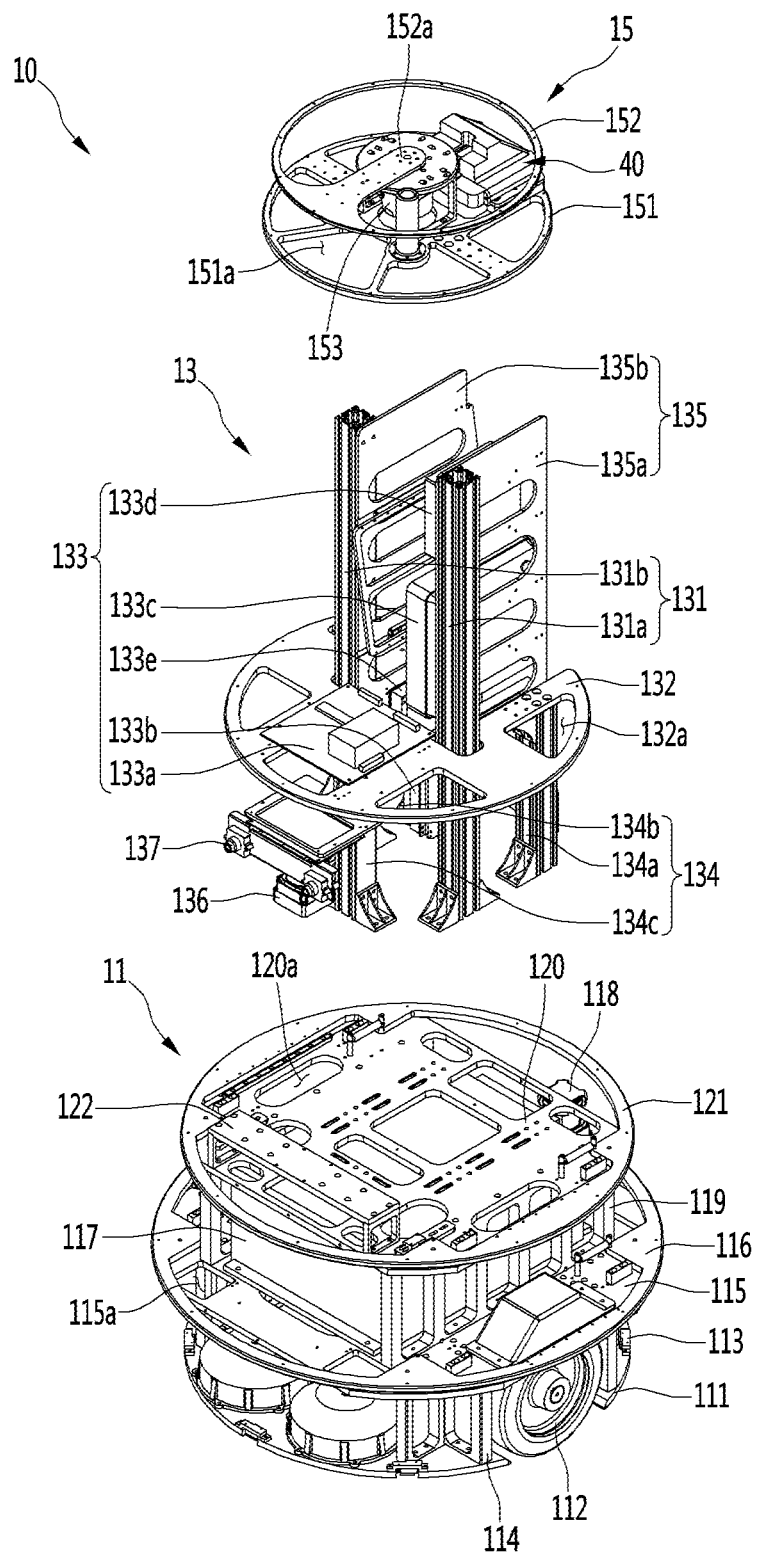
FIG. 7 is an exploded perspective view illustrating the body.
Figure 8:
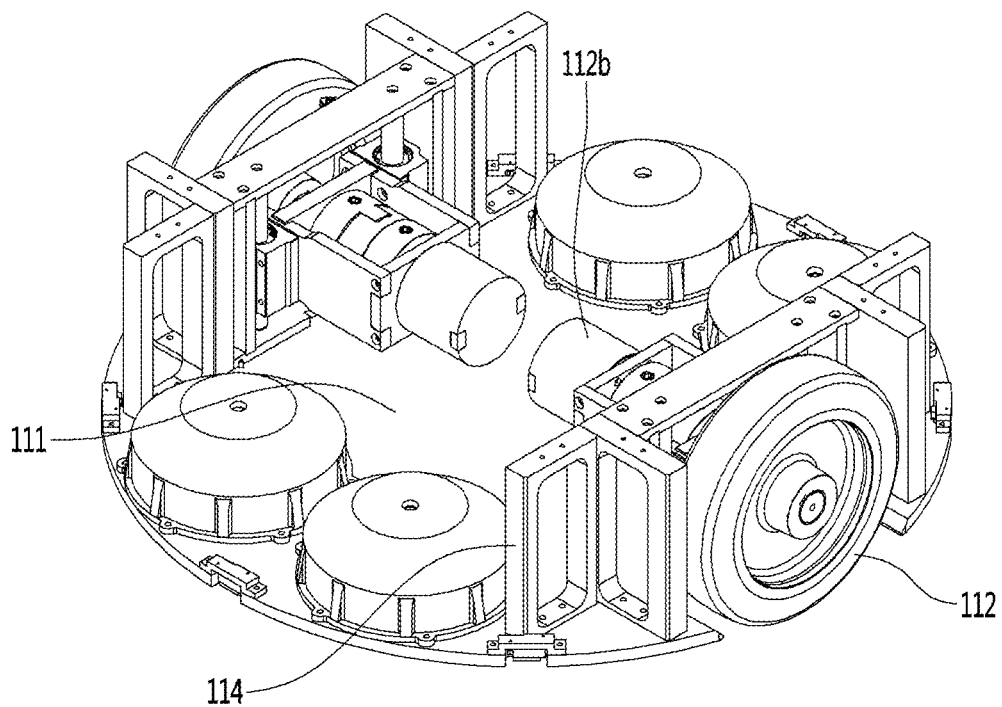
FIG. 8 is a view illustrating a motor and a wheel provided in a driving unit of the body.

The display unit 20 may further include the barcode recognition hole 23. The barcode recognition hole 23 may be a space through which an object including a barcode or a QR code is inserted/withdrawn to read barcode information. The barcode recognition hole 23 may be formed on the front surface of the curved display 21. As an example, the barcode recognition hole 23 may transversely extend from an upper side of the front surface of the curved display 21. Such a barcode recognition hole 23 may extend to the rear surface of the curved display 21 through the front surface of the curved display 21. Further, the object including a barcode or a QR code, which is inserted through the barcode recognition hole 23, may be read by the barcode reader 40 (see FIG. 7) installed inside the body 10.

The barcode recognition hole 23, which is a space through which the object including a barcode or a QR code is inserted, may be named an "insertion hole".

Referring to FIGS. 5 to 8, the body 10 according the present disclosure may include a driving unit 11. The driving unit 11 may include a plurality of components for driving of the guidance robot 1. The driving unit 11 may include the base 111. The base 111 may define the bottom surface of the guidance robot 1. The base 111 may have a circular plate shape, and may be located inside the bottom cover 34.

The driving unit 11 may include the wheel 112 for driving of the guidance robot 1, and motors 112b configured to transfer power to the wheels 112. The wheels 112 may be rotated by the power transferred from the motors 112b. The pair of wheels 112 may be configured, and one wheel 112 may be arranged on each of the left and right sides of the base 111. The pair of motors 112b may be configured, and may be coupled to the pair of wheels 112, respectively. However, the present disclosure is not limited thereto, e.g., one motor 112b may be configured to drive the pair of wheels 112.

The driving unit 11 may further include cliff detection sensors 113. The cliff detection sensors 113 may be sensors configured to detect a precipice or a cliff within a driving range of the guidance robot 1 in all direction, 360 degrees. The plurality of cliff detection sensors 113 may be included. As an example, the plurality of cliff detection sensors 113 may be arranged along an edge of the base 111 to be spaced apart from each other.

The driving unit 11 may further include first support ribs 114. The first support ribs 114 may support a first support plate 115, which will be described below. The first support ribs 114 may extend upwards from the upper surface of the base 111. As an example, the first support ribs 114 may extend upwards from an edge of the base 111. The plurality of first support ribs 114 may be included, some of the first support ribs 114 may be hollow or have recessed sides to minimize weight.

In the present embodiment, two first support ribs 114 may be connected to each other in an "L" shape. However, the present disclosure is not limited thereto. Further, the first support ribs 114 may be arranged in various positions and shapes.

The driving unit 11 may further include the first support plate 115. The first support plate 115 may be seated on the first support ribs 114. The first support plate 115 may have a plate shape. Further, the first support plate 115 may include volume-reducing holes 115a to minimize a weight. The plurality of volume-reducing holes 115a may be formed on the upper surface of the first support plate 115 to be spaced apart from each other.

The driving unit 11 may further include a first bumper 116. When an impact is applied from the outside, the first bumper 116 may be forwards/rearwards moved to absorb a predetermined amount of impact. The first bumper 116 may have a hollow ring shape, and may be arranged on the upper surface of the first support plate 115.

The driving unit 11 may further include a battery 117. The battery 117 may supply electric power for driving of the guidance robot 1. The battery 117 may be arranged at the center of the upper surface of the first support plate 115 in consideration of a center of gravity of the guidance robot 1. Because the battery 117 has the largest ratio of the entire weight of the guidance robot 1, the battery 117 may be more likely to be located at a lower portion of the body 10. The battery 117 may include a Li-ion battery. However, the present disclosure is not limited thereto. Further, the battery 117 may include other types of batteries in addition to the Li-ion battery.

The driving unit 11 may further include the rear lidar 118. The rear lidar 118, which is a laser radar, may be a sensor configured to perform location recognition by irradiating a laser beam and collecting and analyzing a rearwards scattered light beam among light beams absorbed or scattered by an aerosol. The rear lidar 118 may be located on the rear side of the first support plate 115. The rear lidar 118 may be arranged to face the rear side of the guidance robot 1. Further, the rear lidar 118 may be exposed to the outside through the second cutout 332 formed in the second middle cover 33.

The driving unit 11 may further include second support ribs 119. The second support ribs 119 may support a second support plate 120, which will be described below. The second support ribs 119 may extend upwards from the upper surface of the first support plate 115.

The second support ribs 119 may be formed at an edge of the battery 117. As an example, the second support ribs 119 may be formed on opposite sides of the battery 117 to be spaced apart from each other. The plurality of second support ribs 119 may be formed to increase a support force, and upper ends of the plurality of second support ribs 119 may be connected to each other. That is, the second support ribs 119 may have an arch shape. However, the present disclosure is not limited thereto. Further, the second support ribs 119 may have various shapes.

The driving unit 11 may further include the second support plate 120. The second support plate 120 may be seated on the second support ribs 119. The second support plate 120 may have a plate shape. Further, the second support plate 120 may include volume-reducing holes or openings 120a to minimize a weight. The plurality of volume holes 120a may be formed on the upper surface of the second support plate 120 to be spaced apart from each other.

The driving unit 11 may further include a second bumper 121. When an impact is applied from the outside, the second bumper 121 may move or deflect in forward/rearward directions to absorb a predetermined amount of impact, similar to the first bumper 116. The second bumper 121 may have a ring shape, and may be arranged on the upper surface of the second support plate 120.

The driving unit or section 11 may further include a height-adjusting rib 122. The height adjusting rib 122 may provide a predetermined height to the front lidar 136, which will be described below. The height adjusting rib 122 may be arranged below the front lidar 136, and may help to adjust heights of the front lidar 136 and the first cutout 331. The height adjusting rib 122 may extend upwards from the front side of the upper surface of the second support plate 120.

The body 10 may further include a body part or section 13. The body part 13 may be arranged above the driving unit or section 11, and various substrates 133 configured to control an overall operation of the guidance robot 1 may be provided in the body part 13. The substrates 133 may include a first substrate 133a, a second substrate 133b, a third substrate 133c, a fourth substrate 133d, and a fifth substrate 133e.

The body part 13 may include a main frame or main pillar 131. The main frame 131 may support the display unit 20 and a head 15, which will be described below. The main frame 131 may include a first main frame or pillar 131a and a second main frame or pillar 131b. The first main frame 131a and the second main frame 131b may have a column shape that extends vertically. The first main frame 131a and the second main frame 131b may be fixed to the upper surface of the second support plate 120.

As an example, the first main frame 131a and the second main frame 131b may be spaced apart from the center toward opposite sides of the second support plate 120 by the same interval. The first main frame 131a and the second main frame 131b may be bilaterally symmetric to each other with respect to the center of the second support plate 120. Further, the head 15 may be coupled to upper ends of the first main frame 131a and the second main frame 131b.

The body part 13 may further include a third support plate 132. The third support plate 132 may be penetrated by the main frame 131, and may be fitted in any point of the main frame 131. The third support plate 132 may be located below a bisector with respect to a point bisecting the main frame 131. The third support plate 132 may has a disc shape, and may include volume-reducing holes or openings 132a to minimize a weight.

The body part 13 may further include the first substrate 133a. The first substrate 133a may be arranged on the upper surface of the third support plate 132. The first substrate 133a may include, for example, an application processor (AP) board. The AP board may function as a control unit or controller, configured to manage the entire system of a hardware module of the guidance robot 1.

The body part 13 may further include a sub frame 134. The sub frame or sub pillar 134 may be formed below the third support plate 132, and may function to support the third support plate 132. The sub frame 134 is formed to be lower than the height of the main frame 13.

The sub frame 134 may include a first sub frame or sub pillar 134a and a second sub frame or sub pillar 134b. The first sub frame 134a and the second sub frame 134b may have a column shape that extends vertically. Further, the first sub frame 134a and the second sub frame 134b may be fixed to the upper surface of the second support plate 120.

The first sub frame 134a and the second sub frame 134b may be arranged to be adjacent to the main frame 131. As an example, the first sub frame 134a and the second sub frame 134b may be spaced rearwards apart from the first main frame 131a and the second main frame 131b by the same interval, respectively. The first sub frame 134a and the second sub frame 134b may be bilaterally symmetric to each other with respect to the center of the second support plate 120. Further, the third support plate 132 may be coupled to upper ends of the first sub frame 134a and the second sub frame 134a.

The sub frame 134 may further include a third sub frame or sub pillar 134c. The third sub frame 134c may have a column shape that extends vertically. Further, the third sub frame 134c may be fixed to the upper surface of the second support plate 120, similar to the first sub frame 134a and the second sub frame 134b.

The third sub frame 134c may be arranged to be adjacent to the main frame 131. As an example, the third sub frame 134c may be spaced forwards apart from the center of the second support plate 120 by a predetermined distance. The third sub frame 134c may be located in front of the second support plate 120 in consideration of the center of gravity of the third support plate 132. Further, the third support plate 132 may be coupled to an upper end of the third sub frame 134c.

The body part 13 may further include a bracket 135. The bracket 135 may have a plate shape, may vertically extend, and may be coupled to the main frame 131. The bracket 135 may include a first bracket 135a and a second bracket 135b. The first bracket may be coupled to the first main frame 131a, and the second bracket 135b may be coupled to the second main frame 131b. The first bracket 135a and the second bracket 135b may be arranged to face each other. The first bracket 135a and the second bracket 135b may be fixed to surfaces of the first main frame 131a and the second main frame 131b, which face each other.

Further, the first bracket 135a and the second bracket 135b may extend downwards from the upper ends of the first main frame 131a and the second main frame 131b, respectively. Further, a lower portion of the first bracket 135a and a lower portion of the second bracket 135b may pass through the third support plate 132.

The body part 13 may further include the second substrate 133b. The second substrate 133b may be arranged in the first bracket 135a. The second substrate 133b may be arranged at a lower end of the first bracket 135a. The second substrate 133b may include, for example, a micro controller unit (MCU) board. The MCU board may control an overall operation of the guidance robot 1, and may include a memory in which data configured to support various functions of the guidance robot 1 is stored.

The body part 13 may further include the third substrate 133c. The third substrate 133c may be arranged in the first bracket 135a. The third substrate 133c may be arranged on the second substrate 133b. The third substrate 133c may include, for example, a stereo board. The stereo board may process sensing data collected by various sensors and cameras to manage data for recognizing the position of the guidance robot 1 and recognizing an obstacle.

The body part 13 may further include the fourth substrate 133d. The fourth substrate 133d may be arranged in the first bracket 135a. In detail, the fourth substrate 133d may be arranged on the third substrate 133c. The fourth substrate 133d may include, for example, a user interface board. The user interface board may control an operation of a component responsible for input and output of the user.

The body part 13 may further include the fifth substrate 133e. The fifth substrate 133e may be arranged in the second bracket 135b. In detail, the fifth substrate 133e may be arranged inside the second bracket 135b to face the second substrate 133b. The fifth substrate 133e may include, for example, a power board. The power board may perform a control such that electric power of the battery 117 is supplied to each component included in the guidance robot 1.

The present embodiment describes the body part 13 having the five substrates 133a, 133b, 133c, 133d, and 133e. However, the number of the substrates 133 is not limited the above number, and may be smaller or larger than the above number. Further, because the types of the substrates are described as an example, it is apparent that the types of the substrates are not limited to the above-described types of the substrates.

The body part 13 may further include the front lidar 137. The front lidar 137, which is a laser radar, may be a sensor configured to perform location recognition by irradiating a laser beam and collecting and analyzing a rearwards scattered light beam among light beams absorbed or scattered by an aerosol. The front lidar 137 may have the same or similar configuration as that of the rear lidar 118. However, the front lidar 137 may be located on the front side of the second support plate 120. The front lidar 137 may be arranged to face the front side of the guidance robot 1. Further, the front lidar 137 may be exposed to the outside through the first cutout 331 formed in the second middle cover 33. The front lidar 137 may be seated on the height adjusting rib 122 formed in the second support plate 120.

The body part 13 may further include a stereo camera 137. The stereo camera 137 may function to detect an obstacle in front of the guidance robot 1 together with the RGBD sensor 321. The stereo camera 137 may acquire a stereoscopic image using two cameras, and may measure a distance between the guidance robot 1 and the obstacle through the acquired stereoscopic image. As an example, the stereo camera 137 may be located directly above the front lidar 137. The stereo camera 137 may be fixed to one side of the third sub frame 134c. Further, the stereo camera 32 may photograph a front area of the guidance robot 1 through the stereo camera hole 323 formed in the first middle cover 32.

The body 10 may further include head 15. The head or head section 15 may be arranged above the body part 13. Further, the head 15 may be coupled to the top cover 31 and may be configured to rotate the top cover 31. The head 15 may include a fourth support plate 151. The fourth support plate 151 may be seated on an upper end of the main frame 131, and may be coupled to the main frame 131. The fourth support plate 151 may has a disc shape, and may include volume-reducing holes or openings 151a to minimize a weight.

The head 15 may further include a rotation member or frame 152. The rotation member 152 may be arranged on the fourth support plate 151, and may be rotated by a predetermined angle. The rotation member 152 may have a ring shape. Further, the rotation member 152 may be coupled to a rotation motor, which will be described below. The rotation member 152 may include a motor coupling part or a coupler 152a extending from any point of an edge of the rotation member 152 to the center of the rotation member 152. Further, the edge of the rotation member 152 may be coupled to the top cover 31. The top cover 31 may be rotated together by rotation of the rotation member 152.

The head 15 may further include a rotation motor 153. The rotation motor 153 may provide power for rotating the rotation member 152. The rotation motor 153 may have a rotary shaft, and the rotary shaft may be coupled to the motor coupling part 152a. Thus, the rotation member 152 may be rotated in one direction or the other direction by driving of the rotation motor 153. The rotation motor 153 may include, for example, a DC motor. However, the present disclosure is not limited thereto, and various motors such as a stepping motor may be applied.

The head 15 may further include the barcode or QR code reader 40 (hereinafter "reader"). The reader 40 may function to recognize an object including a barcode or a QR code or other types of readable codes. As an example, the reader 40 may recognize various objects including codes on a ticket, a mobile phone, a receipt, etc. The reader 40 may recognize a code included in an object inserted through the recognition hole 23 formed in the display unit 20. According to the present disclosure, the reader 40 may be configured to recognize at least two different kinds of objects to be recognized.

With reference to FIGS. 1-8, the guide robot may be described as having a main body 10 with an internal skeletal frame covered by a shell 30 (or case). The skeletal frame includes a plurality of plates, e.g., plates 111, 115, 120, 132 and 151, stacked vertically and coupled by support ribs 114 and 119, a plurality of pillars 131a and 131b, and/or a plurality of sub-pillars 134a, 134b, and 134c. For example, a first support rib 114 couples a base plate 111 and a first support plate 115, and a second support rib 119 couples the first support plate with a second support plate 120. First, second and third sub-pillars 134a, 134b and 134c couple the second support plate 120 to a third support plate 132. First and second main pillars 131a and 131b couple the second support plate 120 to a fourth support plate 151.

Various components may be mounted between the spaces formed between the plurality of plates 111, 115, 120, 132 and 151. For example, a plurality of wheels 112 and motors 112b to drive the wheels 112 may be provided on the base plate 111 or within a space formed between the base plate 111 and the first support plate 115. A first bumper 116, a battery 117, a rear lidar 118 may be provided on the first support plate 115 or within a space formed between the first base plate 115 and the second support plate 120. On the fourth support plate, a skeletal plate 152 and a motor 153 to rotate the plate 152 may be provided. Details of other components provided on corresponding support plate or within a space between two support plates have been previously described above, and no further explanation is believed to be required. Further, placement and modification of the skeletal frame may be modified based on various needs and functional requirements of the guidance robot. For example, the shape of the support plate may be changed or the number of support plates may be varied. Further, metal or other non-metal rigid material, e.g., plastic, may be used to form the support plates depending on weight and design requirements.

Figure 6:
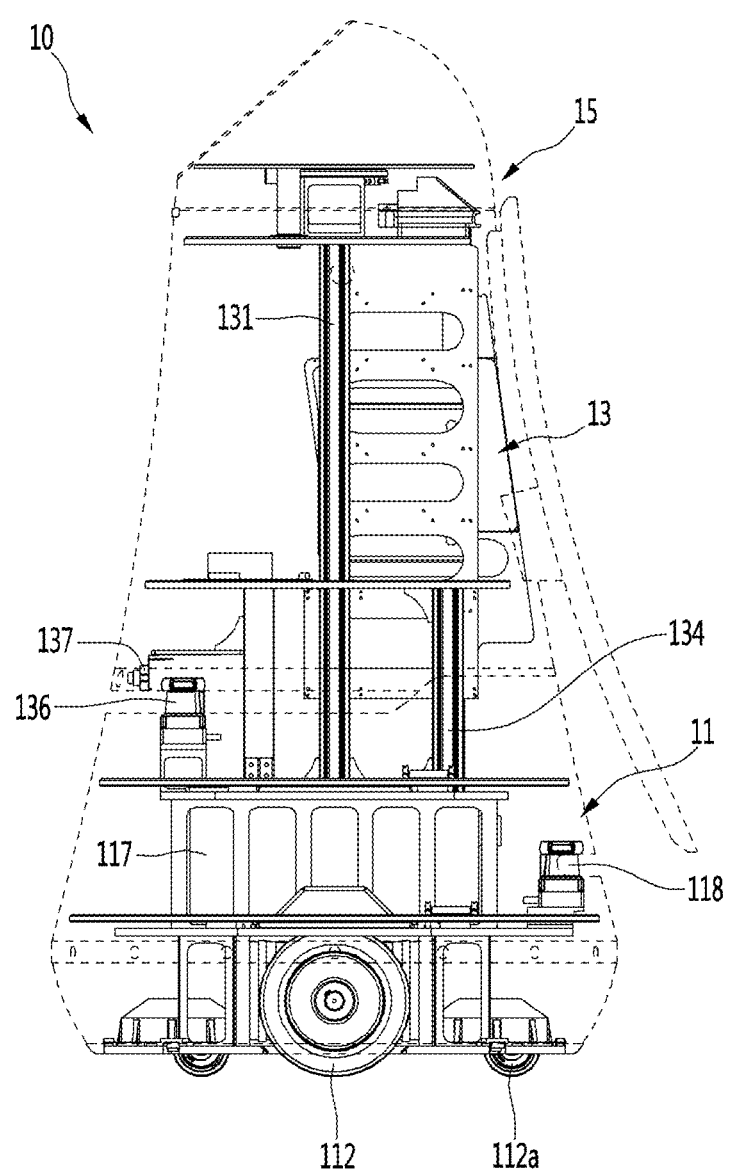
FIG. 6 is a side view illustrating the body.

The shell 30 may comprise four pieces including a top section cover 31 a first middle section cover 32, a second middle section cover 33 and a bottom section 34. As can be appreciated, the shell 30 may be formed as a single piece and cut to four separate pieces. Alternatively, the four pieces may be made separately prior to assembly to the skeletal frame. Further, various holes for sensors or button openings may be cut out after the fabrication of the various covers or may be pre-made or molded during the fabrication process. The shell is thereafter fixed to the skeletal frame, and FIG. 6 illustrates an outline of the various covers on the skeletal frame.

Figure 9:
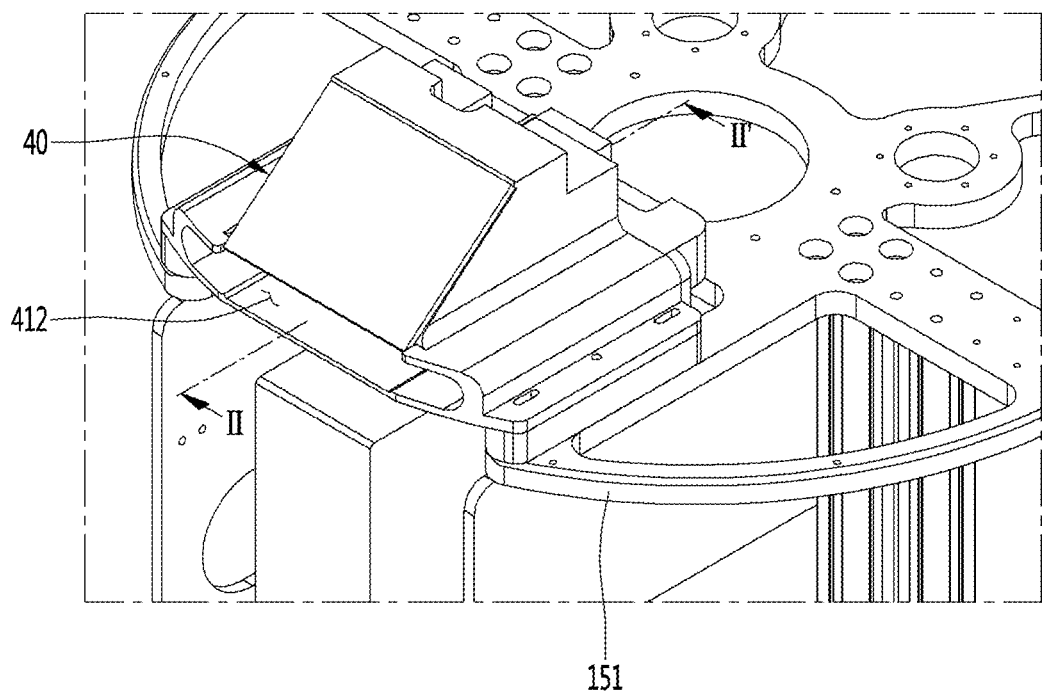
FIG. 9 is a perspective view illustrating a barcode reader.
Figure 10:
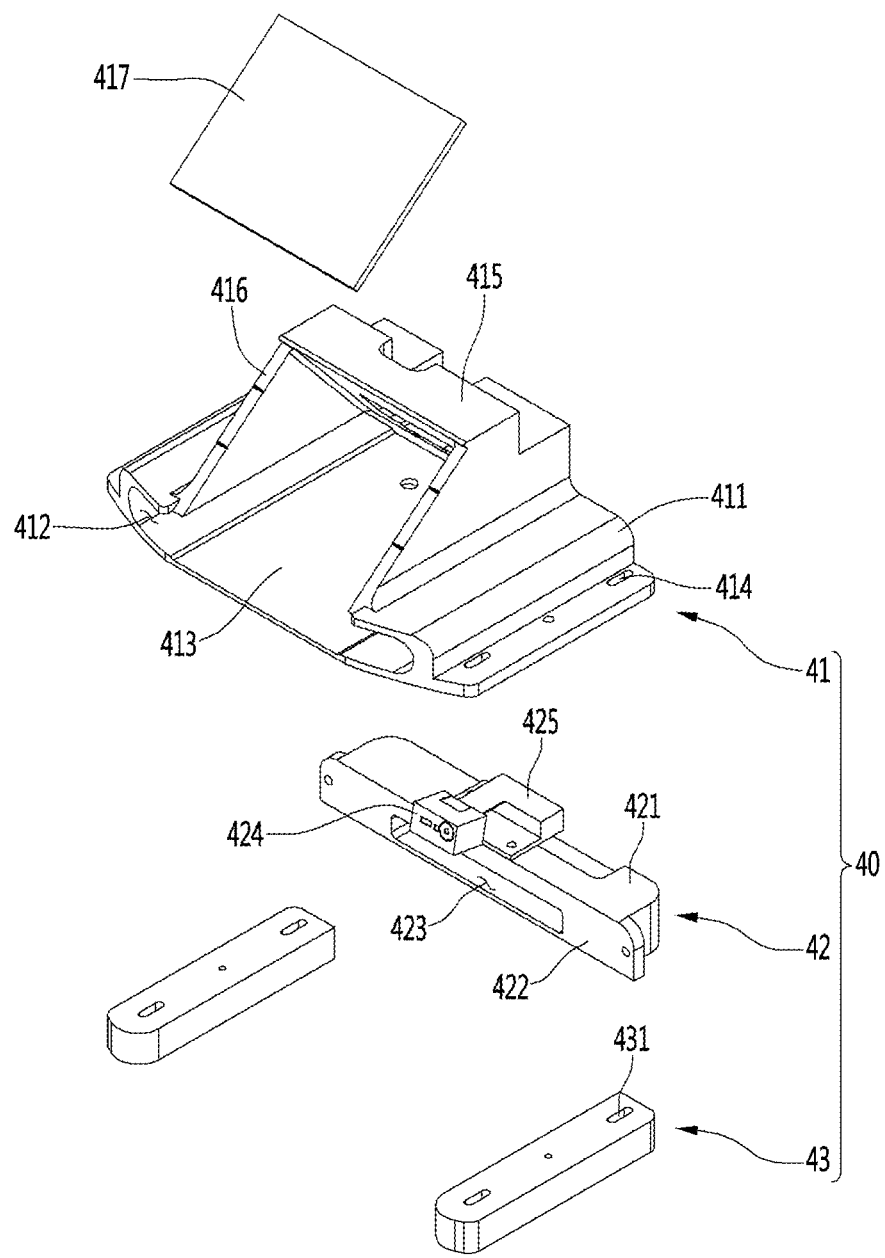
FIG. 10 is an exploded perspective view illustrating the barcode reader.
Figure 11:
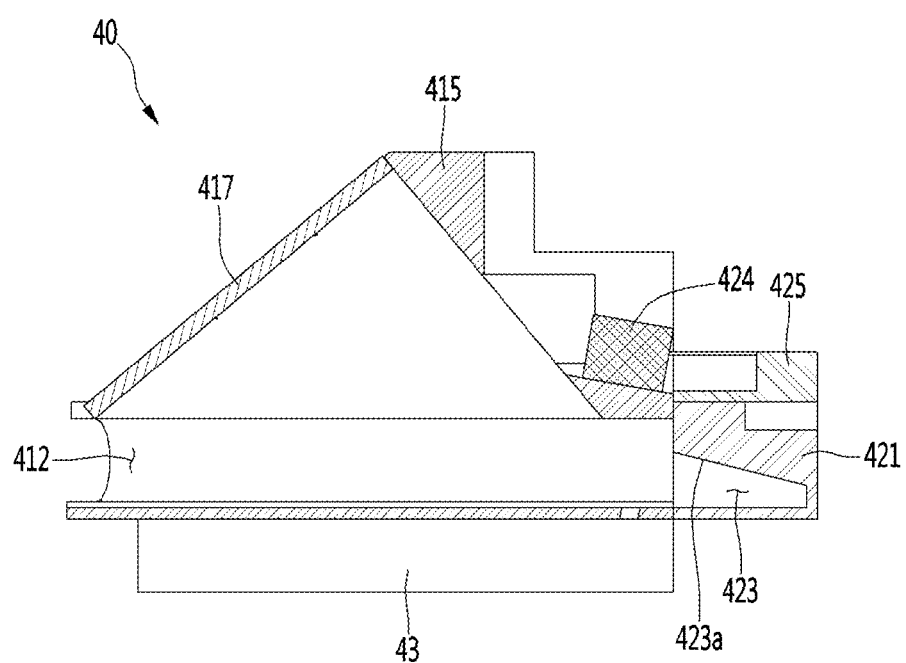
FIG. 11 is a sectional view taken along line II-II' of FIG. 9.

Referring to FIGS. 9 to 11, the reader 40 according to the present disclosure is located on the upper surface of the fourth support plate 151. The reader 40 may be arranged on the upper surface of the fourth support plate 151 to face the display unit 20. The reader 40 may have an insertion space into which a ticket, a mobile phone, or a receipt including codes may be inserted, and the insertion space may face the recognition hole 23. The object inserted through the reader hole 23 may be continuously inserted into the insertion space of the reader 40.

In the present embodiment, the reason why the barcode recognition hole or a reader hole 23 is formed in the display unit 20 is that because the object including a code, that is, a ticket or a mobile phone, extends to be relatively long, the guidance robot should have an accommodation space into which the ticket or the mobile phone may be inserted. The display unit 20 may have a predetermined thickness, and when an insertion hole is formed in a frame of the display unit 20, the insertion hole may serve to support the ticket or the mobile phone such that the volume or size of the reader 40 may be greatly reduced.

Further, to recognize different kinds of two objects to be recognized, the reader 40 may include a first guide groove 412, one side of which is depressed, and a second guide groove 423 which is depressed from the first guide groove 412 by a predetermined depth. The reason why the first guide groove 412 and the second guide groove 423 are formed in the reader 40 is that the depths of objects including readable codes may differ from each other, but the positions of readable codes displayed in objects may be similar to each other.

As an example, for an airline ticket, a barcode or a QR code may be generally located in the middle of the airline ticket. The reason is that because a boarding pass is displayed at an edge of the airline ticket, a part in which the boarding pass is displayed should be cut. As another example, in the case of a mobile phone, a display may be generally located in the middle of the mobile phone. Thus, a barcode displayed in the display may be located in the middle.

In this way, although the lengths of the airline ticket and the mobile phone are different from each other, the positions of the barcodes may be similar to each other as the middle. Thus, when depths (or lengths) by which different kinds of two objects to be recognized are inserted into the reader 40 are differently adjusted, different kinds of two objects to be recognized may be recognized using one reader 40.

The reader 40 may include a body part or a body 41. The body part 41 may define the first guide groove 412 that is an inlet through which the object including a readable code is inserted/withdrawn. In the present embodiment, the first guide groove 412 may be interpreted as an insertion space or an inlet into which the object including a barcode is inserted.

In detail, the body part 41 may include a guide part a guide 411 into/from which the object including a readable code is inserted/withdrawn. The guide part 411 may include the first guide groove 412 into/from which an airline ticket, a mobile phone, or the like including a readable code may be inserted/withdrawn.

The guide part 411 may have a shape, one side and the other side of which are opened, to define the first guide groove 412. Further, the airline ticket, the mobile phone, or the like may be inserted/withdrawn through any one of the opened one side and the opened other side of the guide part 411. As an example, the first guide groove 412 may be formed to have a size and a shape allowing the mobile phone to be inserted. However, the present disclosure is not limited thereto. Further, the first guide groove 412 may be formed to have a size and a shape of another object including a readable code other than the mobile phone.

The guide part 411 may further include an auxiliary guide groove 413. The auxiliary guide groove 413 may be further depressed downwards from an inner side of the first guide groove 412. The auxiliary guide groove 413 may be, for example, a groove allowing paper airline ticket to be seated on the center of the first guide groove 412. As an example, the auxiliary guide groove 413 may be formed to have a width that is similar to or slightly larger than that of the airline ticket. Thus, the auxiliary guide groove 413 may function to guide the airline ticket inserted through the first guide groove 412 to a designated position. Accordingly, a barcode included in the airline ticket may be accurately recognized.

The guide part 411 may further include first fastening holes 414. The first fastening holes 414 may be holes for fastening the guide part 411 to the fourth support plate 151. The first fastening holes 414 may be formed through one side of an edge of the guide part 411. The plurality of first fastening holes 414 may be formed at the edge of the guide part 411.

The body part 41 may further include an extension 415. The extension 415 may have a shape that extends upwards by cutting a portion of the upper surface of the guide part 411. The extension 415 may have a shape, one side of which is opened, and at this time, the opened surface may have an inclined surface 416.

The inclined surface 416 is a part on which a mirror 417, is mounted. The mirror 417 may be arranged on the inclined surface 416. The mirror 417 may be seated on the inclined surface 416 to be inclined. The mirror 417 may be provided to increase a recognition distance for recognizing the readable code included in the airline ticket or the mobile phone.

For example, only when a distance between a readable code and a recognition device exceeds a reference distance, the barcode may be correctly recognized. However, in the case of a robot requiring compactness, because an internal space of the robot is small, it is difficult to secure the recognition distance between the barcode and the recognition device. Thus, in the present embodiment, to solve the above-described problem, a mirror may be used.

The reader 40 may further include a sensor mounted part or a sensor mount 42. The sensor mounted part 42 may include a sensor for recognizing a readable code. Further, the second guide groove 423 may be formed in the sensor mounted part 42. The sensor mounted part 42 may be coupled to the guide part 411 such that the second guide groove 423 communicates with the first guide groove 412.

The sensor mounted part 42 may include a cover 421. The cover 421 may be arranged on the rear side of the guide part 411 to shield the opened rear surface of the guide part 411. The cover 421 may be arranged on the rear side of the guide part 411 to prevent the airline ticket, the mobile phone, or the like from escaping through the opened rear surface of the guide part 411. The cover 421 may maintain the airline ticket, the mobile phone, or the like at a designated position while the airline ticket, the mobile phone, or the like is inserted through the insertion space 412. A front surface 422 of the cover 421 is formed to be flat to prevent the mobile phone, or the like from being inserted by an excessive depth.

The second guide groove 423 may be formed on the front surface 422 of the cover 421. The second guide groove 423 may, for example, function to prevent the airline ticket from being inserted by an excessive depth. In general, the airline ticket may be formed to be wider than the mobile phone and to be longer than the mobile phone. A readable code of the airline ticket should be located at a desired position to accurately recognize the barcode. To this end, the second guide groove 423 may be depressed or recessed rearwards from the front surface 422 of the cover 421 by a predetermined distance. The second guide groove 423 may be narrower than the first guide groove 412. Thus, the mobile phone may be prevented from being inserted into the second guide groove 423.

The second guide groove 423 may include an inclined part or surface 423a, an upper side of which is downwards inclined as it goes in a depth direction. As an example, because the airline ticket is long and light, it is difficult for the airline ticket to be inserted into an inner end of the second guide groove 423. Thus, the upper side of the second guide groove 423 is downwards inclined in the depth direction, so that even when the airline ticket is caught by an upper portion of the second guide groove 423, the airline ticket may be guided to an inner end along a downwards inclined surface.

The sensor mounted part 42 may further include an image sensor 424. The image sensor 424 may be a general code readable sensor for recognizing an object including a barcode or a QR code. The image sensor 424 may recognize the barcode of the object inserted through the first guide groove 412 of the guide part 411.

In the present embodiment, the image sensor 424 may be directed to the upper side at a specific angle to recognize the readable code. The image sensor 424 may recognize the readable code reflected by the mirror 417. To this end, the sensor mounted part 42 may further include an angle adjustment unit or an angle adjuster 425.

The angle adjustment unit 425 may be located above the cover 421 to allow the image sensor 424 to be directed to the upper side at a specific angle. The image sensor 424 may recognize the readable code located below the mirror 417 through the mirror 417 instead of recognizing the readable code located in a straight line direction. A method for recognizing the readable code reflected by the mirror 417 will be described below in more detail.

The reader 40 may further include height adjustment units or a height adjuster 43.

The height adjustment units 43 may be provided to align the height of the first guide groove 412 of the barcode reader 40 with the height of the code recognition hole 23 of the display unit 20. The pair of height adjustment units 43 may be located below the guide part 411. Further, the height adjustment units 43 may include second fastening holes 431 communicating with the first fastening holes 414 of the guide part 411.

The second fastening holes 431 may be formed through points corresponding to the first fastening holes 414 on the upper surfaces of the height adjustment units 43. Screws for fixing the body part 41 may be fastened to the fourth support plate 151 by sequentially passing through the first fastening holes 414 and the second fastening holes 431.

Figure 12:
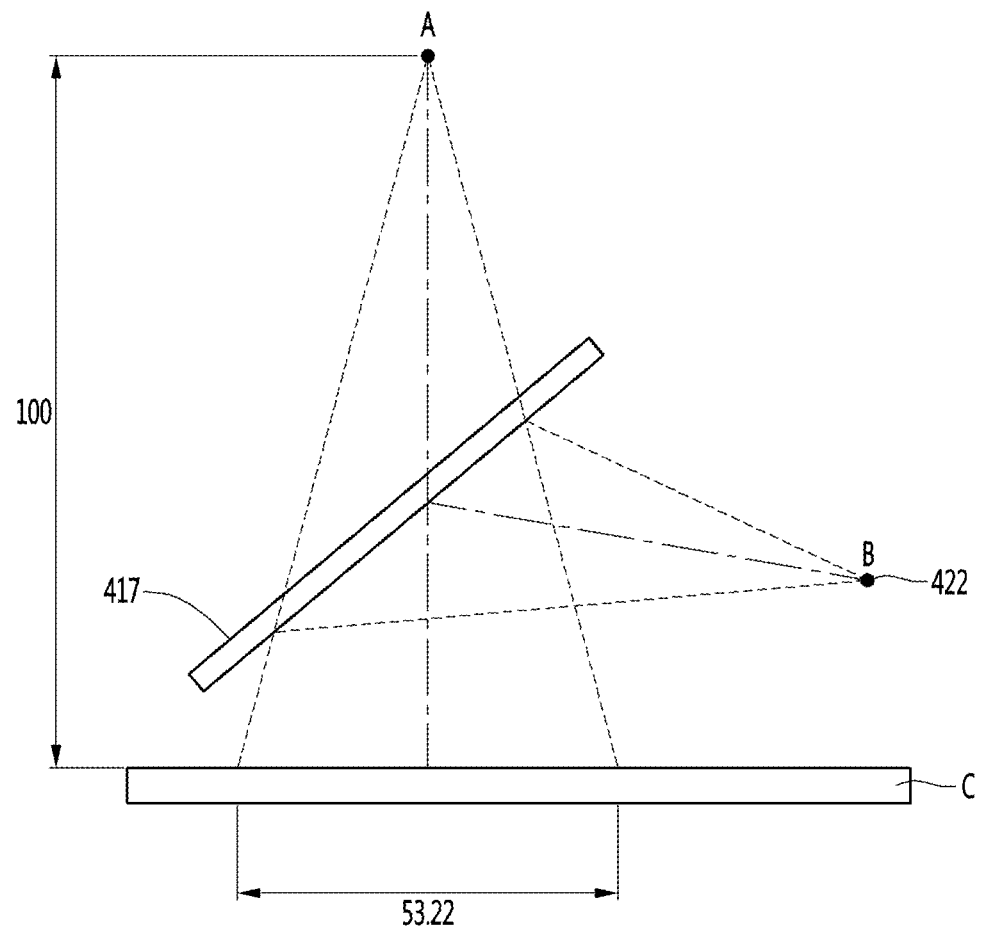
FIG. 12 is a view for explaining a method for recognizing a barcode by the barcode reader.
Figure 13:
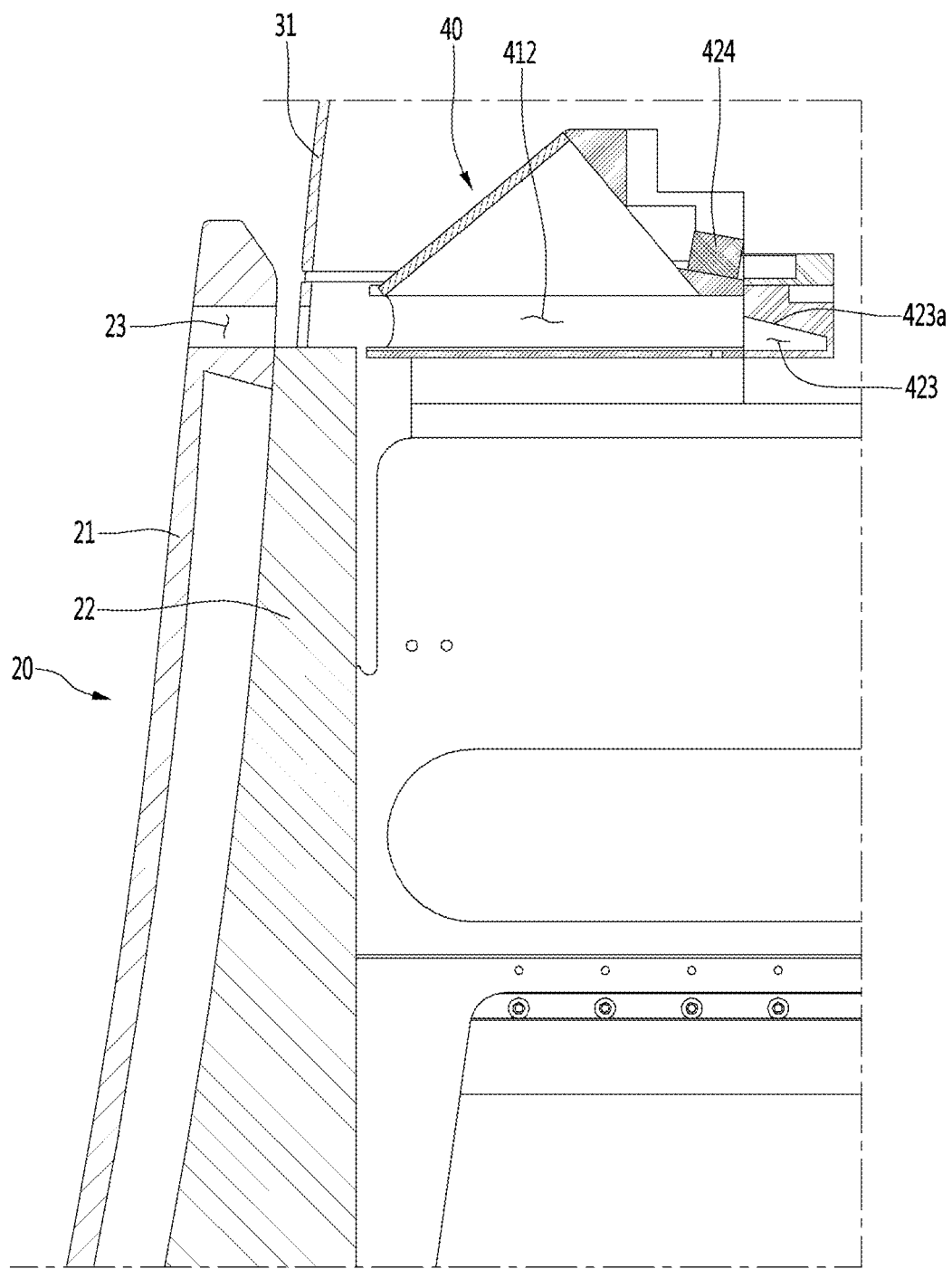
FIG. 13 is a view for explaining a method for inserting an object including a barcode into the barcode reader through a display unit.

Referring to FIGS. 12 to 13, the reader 40 according to the present disclosure may recognize a readable code using the mirror 417. In general, a reader A recognizes a barcode at a position that is perpendicular to an object C including the code, to recognize the code included in the object. The general reader A may maintain a separation distance of 60 to 100 mm to secure a recognition distance between the barcode reader A and the object C including the readable code.

However, in the case of the robot requiring compactness and an internal space of the robot being limited, it is very difficult to secure the recognition distance (60 to 100 mm) between the object including the readable code and a recognition device. Accordingly, in the present disclosure, the mirror 417 may be used to secure the recognition distance between the object C including the readable code and the recognition device.

The object including the readable code is located inside the reader 40. As illustrated in FIG. 13, the object C may be inserted into the reader 40 through the code recognition hole 23 of the display unit 20. At this time, because the code recognition hole 23 and the first guide groove 412 may be located on a straight line, it is easy to insert the object C. Further, the mirror 417 may be located on one side of the upper side of the object C.

The mirror 417 may be arranged to be inclined at a specific angle. As an example, the mirror 417 may be arranged to form an angle of 35 to 45 degrees with respect to the object C. Further, the image sensor 424 arranged to face the mirror 417 may be located on the other side of the upper side of the object C. At this time, the image sensor 424 may be directed to the mirror 417. The image sensor 424 may be directed to the upper side at a specific angle toward the mirror 417. The image sensor 424 may recognize the readable code of the object C through the mirror 417. The barcode reader 40 according to the present disclosure may compensate for the recognition distance (60 to 100 mm) by using refraction of light through the mirror 417.

In the present embodiment, the image sensor 424 may set a code recognition range to 50 mm or more, to accurately recognize the readable code included in the object C. To this end, the mirror 417 may be arranged to be inclined at various angles as well as 40 degrees, which has been described above.

According to the structure of the present disclosure, because the recognition distance between the object included in the readable code and the code recognition device may be secured within the robot in which the internal space is limited, the guidance robot may become compact. Further, because information on a readable code included in a mobile device such as the mobile phone as well as the airline ticket may be recognized together, versatility is improved.

In the present embodiment, the structure by which different kinds of two objects to be recognized may be recognized by one reader has been described. However, the number of the objects to be recognized may be three or more as well as two. In this case, the reader may include a first guide groove depressed or recessed such that an object including a readable code is inserted into the first guide groove, a second guide groove further depressed or recessed from the first guide groove by a predetermined depth, and a third guide groove further depressed or recessed from the second guide groove by a predetermined depth.

Further, although the method for recognizing the readable code has been described in the present embodiment, the present disclosure is not limited thereto. Further, the present disclosure may be applied to various two-dimensional codes such as a quick response (QR) code.

Hereinafter, a reader of a guidance robot according to another embodiment of the present disclosure will be described with reference to the accompanying drawings. The present embodiment is different from the first embodiment in terms of a configuration of the reader, and is identical to the first embodiment in other parts. Thus, only characteristic parts of the second embodiment of the present disclosure will be described below, and the same parts as those according to the first embodiment will be cited again.

Figure 14:
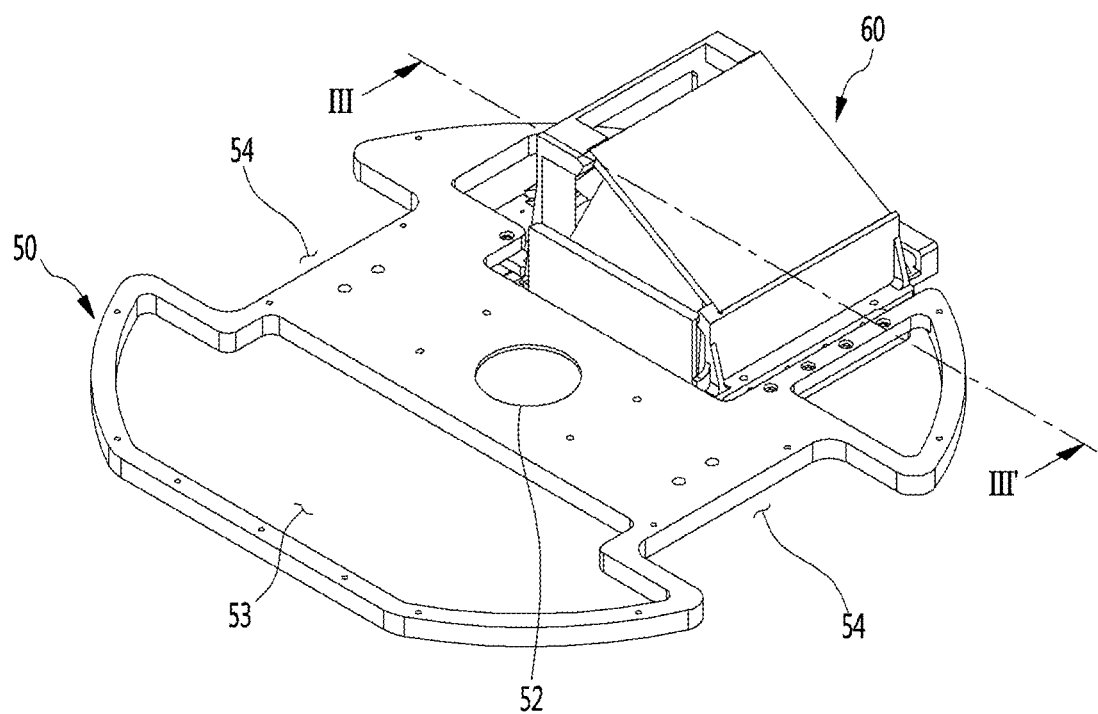
FIG. 14 is a perspective view illustrating a barcode reader of a guidance robot according to a second embodiment of the present disclosure when viewed from the front side.
Figure 15:
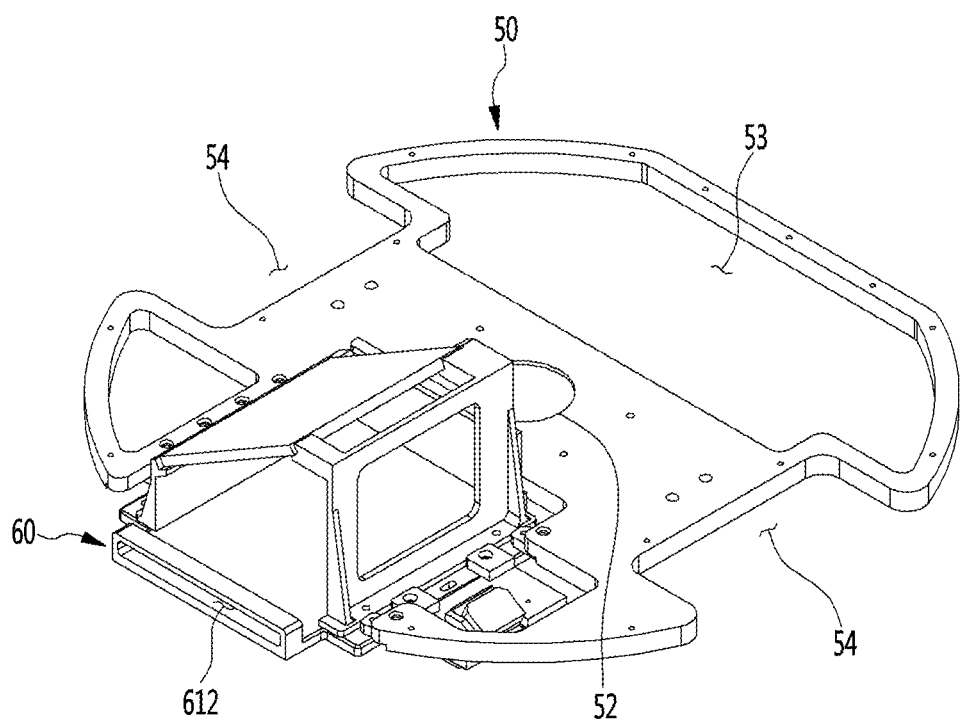
FIG. 15 is a perspective view illustrating the barcode reader of FIG. 14 when viewed from the rear side.
Figure 16:
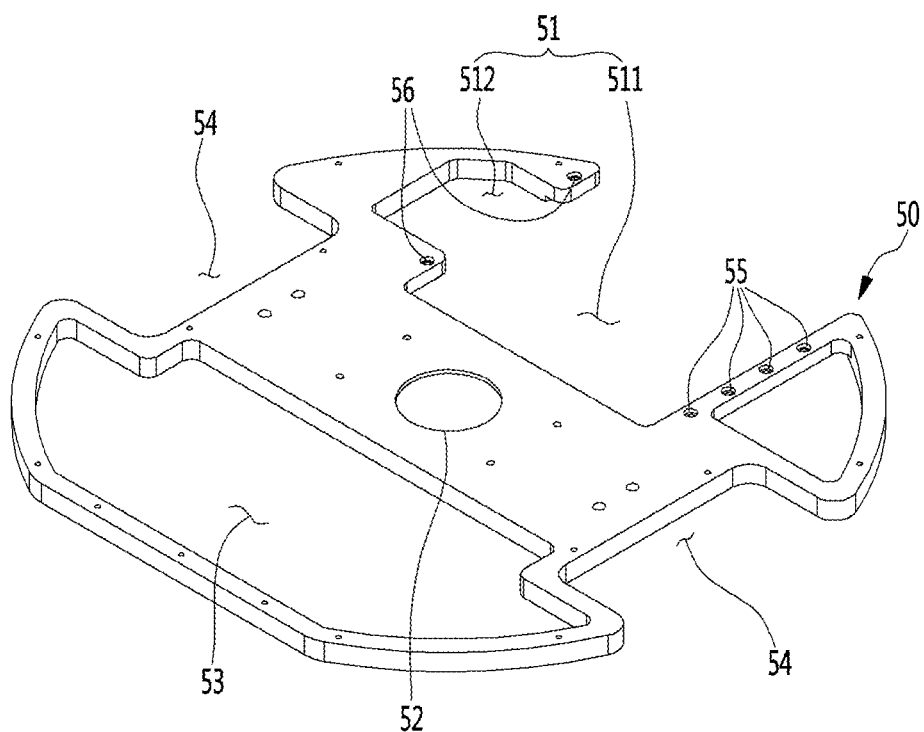
FIG. 16 is a perspective view illustrating a fourth support plate of the guidance robot according to the second embodiment of the present disclosure.
Figure 17:
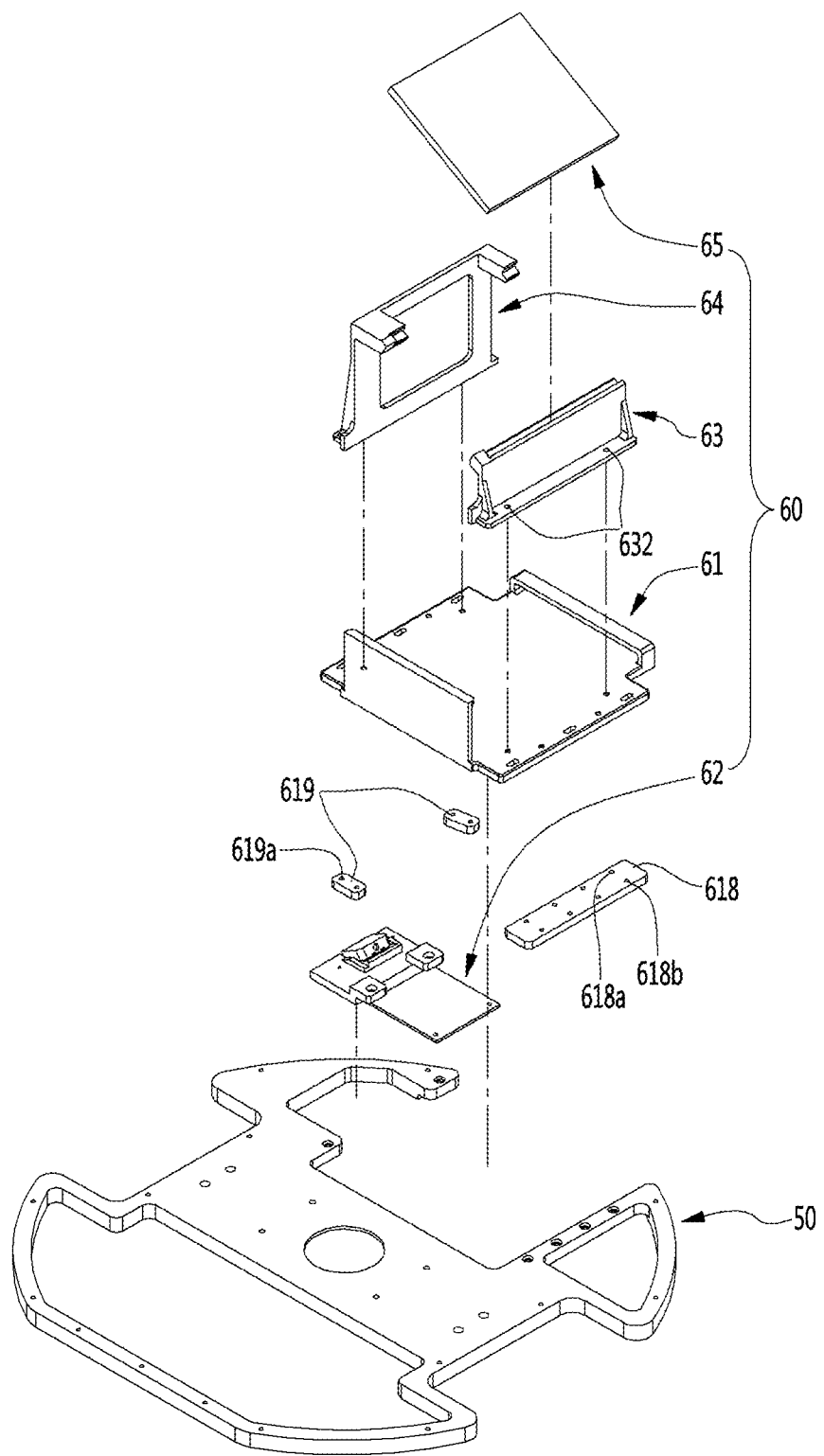
FIG. 17 is an exploded perspective view illustrating the barcode reader of FIG. 14.

Referring to FIGS. 14 to 16, a guidance robot according to the second embodiment is different from the guidance robot according to the first embodiment in terms of the reader 60, and the shape of the fourth support plate 50 supporting the barcode reader 60.

The reader 60 according to the present embodiment is located inside the fourth support plate 50. An opening 51 in which at least a portion of the reader 60 is located is formed in the fourth support plate 50. The opening 51 may be formed by cutting a portion of the fourth support plate 50.

A portion of the reader 60 is located inside the opening 51. At this time, the reader 60 may be connected to the fourth support plate 50 through a separate connection member such that a portion of the reader 60 is located inside the opening 51.

In detail, the fourth support plate 50 may have an approximately disc frame shape. Further, a motor mounting hole 52 on which a motor configured to rotate the above-described rotation member is mounted is formed at the center of the fourth support plate 50.

The fourth support plate 50 may include weight and/or volume-reducing holes 53 to minimize a weight. The volume-reducing holes 53 are formed by cutting a portion of the fourth support plate 50. Although the volume-reducing holes 53 may be formed in front of the motor mounting hole 52, the present disclosure is not limited thereto. Further, the plurality of volume-reducing holes 53 may be formed at various positions.

The fourth support plate 50 may include speaker openings 54 in which a portion of the speaker is located. The speaker openings 54 may be formed by cutting a portion of an edge of the fourth support plate 50. In the present embodiment, the speaker openings 54 may be formed on opposite sides of the motor mounting hole 52. A pair of speaker openings 54 may be formed, and at this time, a pair of speaker may be mounted on an inner peripheral surface of the above-described first middle cover to face each other. The pair of speaker holes 54 may be formed to have a size and a shape corresponding to the pair of speaker. The pair of speaker openings 54 may have the same or similar shape and/or the same or similar size.

The fourth support plate 50 may include an opening in which a portion of the reader 60 is located. The opening 51 provides a specific space such that the reader 60 is located inside the top cover 31 or the first middle cover 32 of the above-described case 30. The opening 51 may be formed on the rear side of the motor mounting hole 52.

The opening 51 may include a first opening 511 formed on the rear side of the motor mounting hole 52, and a second opening 512 opened from one side of the first opening 511 by a predetermined distance. Here, the first opening 511 may be understood as a space in which a ticket seated part 10 of the reader 60, which will be described below, is located, and the second opening 512 may be understood as a space in which a sensor mounted part 62 of the reader 60, which will be described below, is located.

The first opening 511 may have an approximately rectangular shape, and may be opened to correspond to the shape of the ticket seated part 61 (or ticket seat), which will be described below. Further, the second opening 512 may have s shape that is further cut from one side of the first opening 511 in a lengthwise direction.

In the present embodiment, to improve a recognition rate for a readable code included in a receipt, the second opening 512 as well as the first opening 511 formed in the fourth support plate 50 are used together, so that a recognition distance for recognizing the barcode is maximally secured.

Referring to FIGS. 15 to 18, the reader 60 may be arranged inside the opening 51 formed in the fourth support plate 50, and may be arranged to face the above-described display unit 20. The reader 60 may have an insertion space into which a ticket, a receipt, or the like including a readable code may be inserted, and the insertion space may face the hole 23. An object inserted through the 23 may be continuously inserted into the insertion space of the reader 60.

The hole 23 is formed in the display unit 20 is to provide support for the object including a readable code, that is, a ticket or a receipt, which are relatively long, the guidance robot should have an accommodation space into which the ticket or the receipt may be inserted. The display unit 20 may have a predetermined thickness. When an insertion hole is formed in a frame of the display unit 20, the insertion hole may serve to support the ticket or the receipt, so that the volume or size of the reader 60 may be greatly reduced.

The reader 60 may include a ticket seated part or a ticket seat section 61 on which the ticket is seated. The ticket seated part 61, which is a portion on which the ticket including a readable code is seated, may have a shape, an upper surface of which is flat such that the readable code is easily recognized. The ticket seated part 61 may have a rectangular or circular plate shape. The ticket seated part 61 serves to support the ticket to recognize the readable code included in the ticket. The ticket seated part 61 is arranged inside the first opening 511 formed in the fourth support plate 50.

The ticket seated part 61 includes a plate 611 defining a surface on which the ticket is seated. As an example, the plate 611 may be formed to have an approximately rectangular shape. Further, a guide part or a guide 612 having a guide groove 612*a* through which the ticket is inserted/withdrawn may be formed on one side of an edge of the plate 611.

The guide part 612 serves to guide the ticket such that the ticket may be seated at a predetermined position of the ticket seated part 61. The guide part 612 extends upwards from a rear edge of the plate 611 to provide the predetermined guide groove 612*a*.

The guide groove 612*a* may be formed to have a size corresponding to the width of the ticket such that the ticket may be inserted therethrough. The guide groove 612*a* is formed by opening a portion of the guide part 612, and is arranged to face the hole 23 of the display unit 20. The ticket may pass through the hole 23, and may be inserted into the upper surface of the ticket seated part 61 through the guide groove 612*a*.

Further, the ticket seated part 61 may further include a stopper 613. The stopper 613 serves to adjust an insertion depth of the ticket inserted through the guide groove 612*a*. The stopper 613 may extend upward from a front edge of the plate 611 facing the guide part 612. On the other hand, the stopper 613 may be formed on an opposite side of the guide part 612.

The stopper 613 may have a length corresponding to the length of the guide part 612, and may have a predetermined height. Thus, the ticket inserted through the guide groove 612*a* is prevented from being excessively inserted, and the inserted ticket is prevented from being separated to the outside of the plate 611. The stopper 613 guides the ticket inserted through the guide groove 612*a* such that the ticket is located at a designated position, so that the readable code included in the ticket may be accurately recognized.

The ticket seated part 61 may further include mounting holes 614*a* and 614*b* through which mirror support parts 63 and 64 supporting a mirror 65, which will be described below, are mounted. The mounting holes 614*a* and 614*b* include first mounting holes 614*a* through which a first mirror support part 63 is mounted, and second mounting holes 614*b* through which a second mirror support part 64 is mounted.

The first mounting holes 614*a* are formed on one side of the plate 611, and the second mounting holes 614*b* are formed on the other side of the plate 611. The pair of first mounting holes 614*a* and the pair of second mounting holes 614*b* may be formed, and may be spaced apart from each other. As an example, the first mounting holes 614*a* may be formed on one side of the plate 611, which corresponds to a portion between the guide part 612 and the stopper 613, and the second mounting holes 614*b* may be formed on the other side of the plate 611, which corresponds to a portion between the guide part 612 and the stopper 613. Further, the first mounting holes 614*a* and the second mounting holes 614*b* may be symmetric to each other.

The ticket seated part 61 may further include holes 616*a* and 616*b* to which connection members or plates 618 and 619 to be connected to the fourth support plate 50 are fastened. The holes 616*a* and 616*b* include first holes 616*a* to which a first connection member or plate 618, which will be described below, is fastened, and second holes 616*b* to which second connection members or plates 619, which will be described below, are fastened. The first holes 616*a* and the second holes 616*b* may be formed at edges of the plate 611.

The first holes 616*a* and the second holes 616*b* may include a plurality of holes, and the plurality of holes may be spaced apart from each other. The first holes 616*a* and the second holes 616*b* may include the same number of holes having the same shape, and the holes may be arranged to be symmetric to each other.

The ticket seated part 61 may be located inside the opening 51 of the fourth support plate 50 through connection of the plurality of connection members 618 and 619.

The ticket seated part 61 may not directly connect to the fourth support plate 50. The ticket seated part 61 may not be directly in contact with the fourth support plate 50, and may be fixed to the fourth support plate 50 through a separate connection member. The reason is to maximize an installation space for the barcode reader in consideration of a volume or size of the reader.

In the present embodiment, the ticket seated part 61 is fixed to the fourth support plate 50 through the first connection member 618 and the second connection members 619. The first connection member 618 and the second connection members 619 fix opposite sides of the ticket seated part 61 to the fourth support plate 50. The first connection member 618 connects one end of the ticket seated part 61 to one side of the fourth support plate 50.

Figure 18:
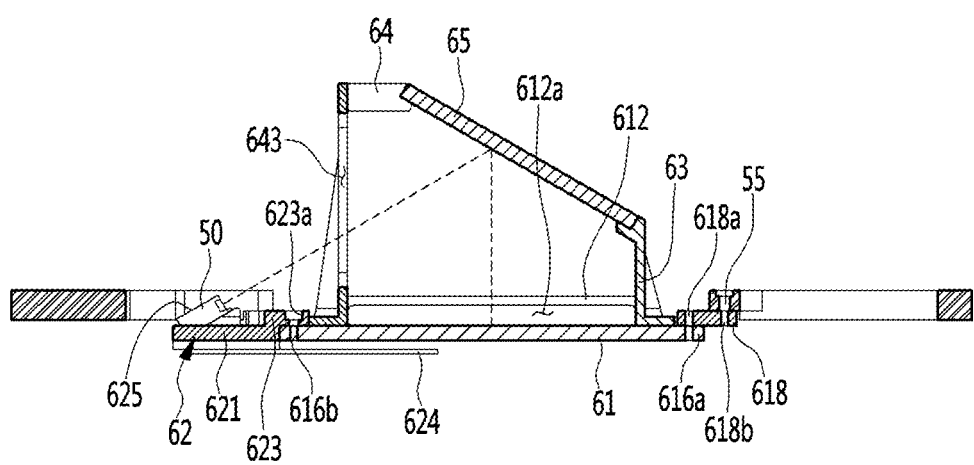
FIG. 18 is a sectional view taken along line III-III' of FIG. 14.
Figure 19:
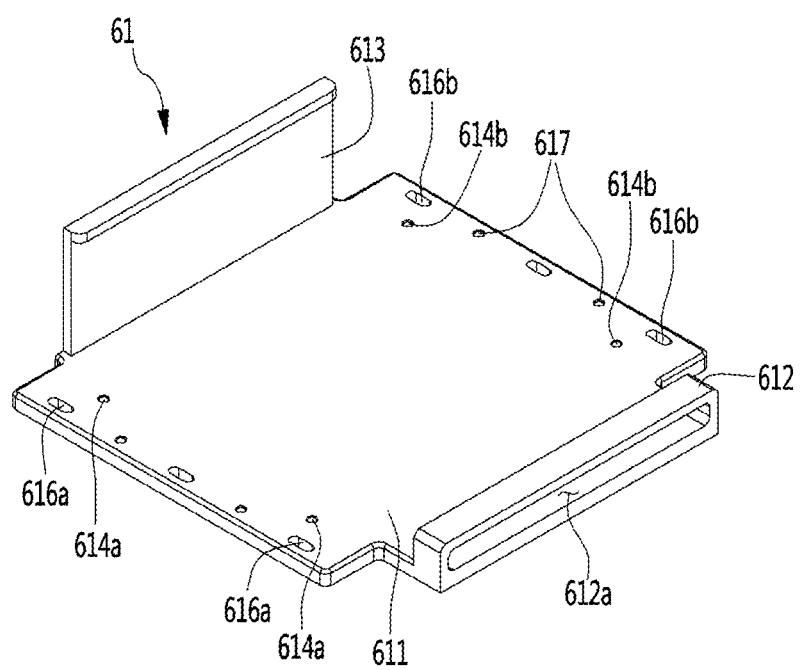
FIG. 19 is a perspective view illustrating a ticket seated part of the barcode reader of FIG. 17.
Figure 20:
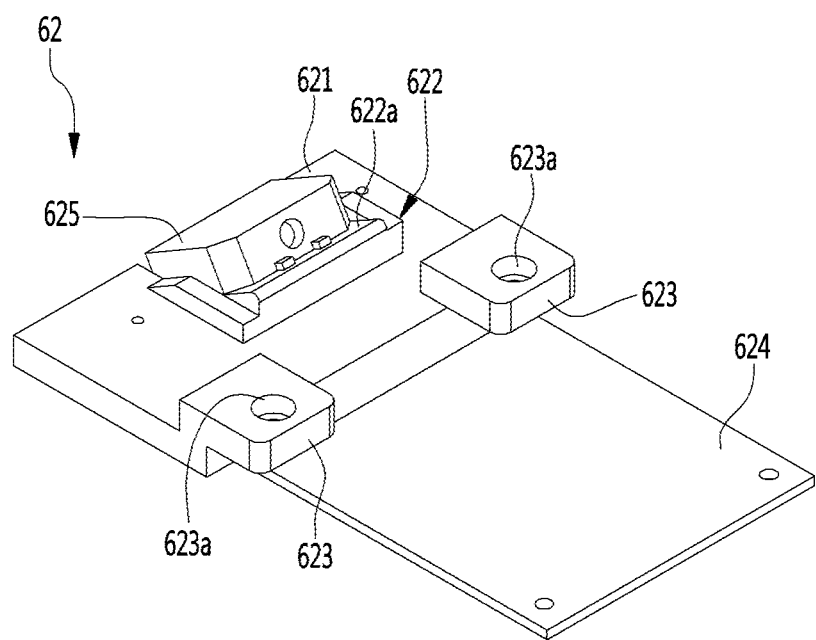
FIG. 20 is a perspective view illustrating a sensor mounted part of the barcode reader of FIG. 17.
Figure 21:
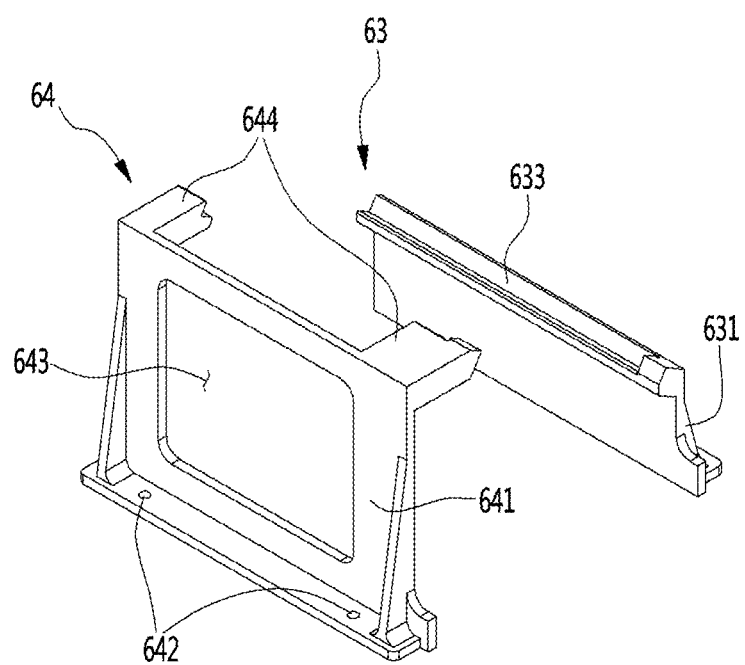
FIG. 21 is a perspective view illustrating a mirror supporting part the barcode reader of FIG. 17.

As illustrated in FIG. 18, the ticket seated part 61 and the fourth support plate 50 are vertically spaced apart from each other. The first connection member 618 is arranged between the ticket seated part 61 and the fourth support plate 50 to connect the ticket seated part 61 and the fourth support plate 50 to each other. The bottom surface of the first connection member 618 may be in contact with the upper surface of the ticket seated part 61, and the upper surface of the first connection member 618 may be in contact with the bottom surface of the fourth support plate 50.

To this end, first fastening holes 618*a* to be fastened to the first holes 616*a* of the ticket seated part 61 are formed on one side of the first connection member 618. Second fastening holes 618*b* to be fastened to the fourth support plate 50 are formed on the other side of the first connection member 618. The first connection member 618 may be fastened to the ticket seated part through one fastening member, and may be fastened to the fourth support plate 50 through the other fastening member. The plurality of first fastening holes 618*a* and the plurality of second fastening holes 618*b* may be configured, and the plurality of fastening holes may be spaced apart from each other.

In the present embodiment, the first connection member 618 may have a predetermined width, and may have a shape extending in a front-rear direction. However, the present disclosure is not limited thereto, and the first connection member 618 may be implemented in a circular or polygonal shape as well as in a rod shape. Further, the second connection members 619 connect the other end of the ticket seated part 61 to the other side of the fourth support plate 50.

The ticket seated part 61 and the fourth support plate 50 are vertically spaced apart from each other. Further, the second connection members 619 are arranged between the ticket seated part 61 and the fourth support plate 50 to connect the ticket seated part 61 and the fourth support plate 50 to each other. The bottom surfaces of the second connection members 619 may be in contact with the upper surface of the ticket seated part 61, and the upper surfaces of the second connection members 619 may be in contact with the bottom surface of the fourth support plate 50.

To this end, first fastening holes 619a to be fastened to the second holes 616b of the ticket seated part 61 are formed on sides of the second connection members 619. Further, second fastening holes 619b to be fastened to the fourth support plate 50 are formed on the other sides of the second connection members 619. Thus, the second connection members 619 may be fastened to the ticket seated part through one fastening member, and may be fastened to the fourth support plate 50 through the other fastening member.

In the present embodiment, the pair of second connection members 619 may be configured. As an example, one second connection member 619 may be arranged at one apex of the ticket seated part 61, and the other one second connection member 619 may be arranged at the other apex of the ticket seated part 61. That is, the pair of second connection members 619 may be spaced apart from each other, and the sensor mounted part 62, which will be described below, may be arranged between the pair of second connection members 619.

Meanwhile, the ticket seated part 61 may further include coupling holes 617 to which the sensor mounted part or sensor mount 62, which will be described below, is coupled. The coupling holes 617 may be formed on the plate 611, and may be arranged between the plurality of holes 616b to which the second connection members 619 are fastened.

Further, the reader 60 may further include the sensor mounted part 62 to which an image sensor 625 is mounted. As described above, the sensor mounted part 62 may be located inside the second opening 512 formed in the fourth support plate 50. To this end, the sensor mounted part 62 may be fixed and coupled to one side of the ticket seated part 61. In the present embodiment, the sensor mounted part 62 may be coupled to one side of the plate 611, which corresponds to a portion between the pair of second connection members 619.

In detail, the sensor mounted part 62 includes a body part or a body 621 on which the sensor 625 is seated. The body part 621 may be formed to have, for example, a flat rectangular shape. Further, a seating part or a seating support 622 on which the image 625 is seated is formed by cutting a portion of the body part 621.

The sensor 625 is seated on the seating part 622. Further, a predetermined inclined surface 622a is formed on the seating part 622 such that the sensor 625 is directed to the upper side at a predetermined angle. The sensor 625 may be mounted on the inclined surface 622a to recognize the readable code reflected by the mirror 65 located above the sensor 625.

The sensor mounted part 62 may further include coupling parts or coupler 623 to be fixed to one side of the ticket seated part 61. The coupling parts 623 protrudes from the upper surface of the body part 621 and extends to the outside. That is, the coupling parts 623 may be bent in an approximately "L" shape. Fastening holes 623a to be screw-fastened to the coupling holes 617 formed in the plate 611 are formed the coupling parts 623, respectively. Thus, as illustrated in FIG. 18, the sensor mounted part 62 may be fixed to the ticket seated part 61 through the coupling parts 623.

Further, the sensor mounted part 62 may further include the sensor 625 configured to recognize a readable code. The sensor 625 may be a general image sensor configured to recognize an object including a readable code. The sensor 625 may recognize the readable code of the ticket inserted through the guide groove 612a of the guide part 612.

The sensor 625 may be directed to the upper side at a specific angle to recognize the readable code. The sensor 625 may recognize the readable code reflected by the mirror 65 which will be described below. To this end, the sensor 625 may be mounted on the inclined surface 622a formed in the seating part 622.

The sensor mounted part 62 may further include a substrate 624 including components configured to process information input from the sensor 625. The substrate 624 may transversely extend from one side of the body part 621. The substrate 624 may analyze information (barcode image) received from the sensor 625.

The barcode reader 60 may further include the mirror support parts 63 and 64 (or mirror supports) arranged in the ticket seated part 61. The mirror support parts 63 and 64 include the first mirror support part 63 configured to support one end of the mirror 65 and the second mirror support part 64 configured to support the other end of the mirror 65.

As described above, the first mirror support part 63 and the second mirror support part 64 are arranged at edges of the plate 611 of the ticket seated part 61. The first mirror support part 63 is arranged on one side of the plate 611, and the second mirror support part 64 is arranged on the other side of the plate 611.

The first mirror support part 63 (or a first mirror support) includes a first bracket 631 extending upwards from the upper surface of the plate 611 along one edge of the plate 611 in a predetermined length. Holes 632 to be screw-coupled to the first mounting holes 614a formed in the plate 611 are formed at a lower end of the first bracket 631.

An insertion part or an insert 633 into which one side of the mirror 65 is to be inserted is formed at an upper end of the first bracket 631. A portion of the insertion part 633 may be depressed such that a portion of the mirror 65 is inserted thereinto.

The second mirror support part 64 (or a second mirror support) includes a second bracket 641 extending upwards from the upper surface of the plate 611 along an opposite edge of the plate 611 in a predetermined length. Holes 642 to be screw-coupled to the second mounting holes 614b formed in the plate 611 are formed at a lower end of the second bracket 641.

Further, the second bracket 641 includes a through-hole or a window 643 formed by opening a central portion of a portion extending upwards from the upper surface of the plate 611. The through-hole 643 may be opened, for example, in a rectangular shape. The through-hole 643 may be a hole for operating the sensor configured to recognize a readable code. A detection signal transferred from the sensor 625 may scan the readable code reflected by the mirror 65 through the through-hole 643.

An insertion part or an insert 644 into which the other side of the mirror 65 is to be inserted is formed at an upper end of the second bracket 641. The insertion part 644 may be formed by allowing a portion of the upper end of the second bracket 641 to protrude toward the first mirror support part 63. Further, an end of the insertion part 644 may be depressed such that at least a portion of the mirror 65 is inserted thereinto.

The reader 60 may further include the mirror 65. The mirror 65 may be provided to increase a recognition distance for recognizing the barcode included in the airline ticket or the receipt. To this end, the mirror 65 may be supported by the first mirror support part 63 and the second mirror support part 64, which has been described above.

One side of the mirror 65 may be inserted into the insertion part 633 of the first bracket 631, and the other side of the mirror 65 may be inserted into the insertion part 644 of the second bracket 641. At this time, because the second bracket 641 is formed to be relatively higher than the height of the first bracket 631, the mirror 65 may be inclined at a specific angle. A portion of the mirror 65, which corresponds to a portion of the first bracket 631, may be arranged to be lower than a portion of the mirror 65, which corresponds to a portion of the second bracket 641.

According to the above-described configurations of the mirror 65 and the mirror support parts 63 and 64, the sensor 625 may scan the readable code included in the ticket through an inner reflection surface of the mirror 65. To improve a recognition rate for the readable code included in the ticket or the receipt, while the size of the head 15 is not increased, the reader is located inside the first opening and the second opening of the fourth support plate. The recognition distance required for recognizing the barcode may be maximized.

According to the above-described configuration of the present disclosure, the present disclosure may recognize the barcode or a QR code included in the object such as a ticket, and accordingly, may provide a rapid and accurate route guidance service to the user.

Further, the recognition distance between the readable code included in the object and the code recognition device may be sufficiently secured within a narrow internal space of the robot, the compactness of the robot may be implemented.

Further, because an object to be recognized is recognized while being inserted through an insertion hole formed in a display unit, the object to be recognized may be easily inserted. Further, the insertion hole into which the object to be recognized is to be inserted may be covered, and thus, an outer appearance looks beautiful.

Further, when an object including a barcode is inserted into a barcode recognition device, the object is prevented from escaping to the outside, so that when the barcode is recognized, loss of the object to be recognized is minimized, and the barcode may be rapidly recognized.

Further, because different objects including barcodes may be seated on a predetermined position of the barcode recognition device, barcodes of various objects may be recognized, so that versatility is improved.

A guidance robot may promptly and accurately provide a route guidance service to a user by recognizing a barcode included in an object such as a boarding pass.

A guidance robot may provide sufficient recognition distance between a barcode of an object and a barcode recognition device in a limited space inside the guidance robot.

A guidance robot may allow easy insertion of an object having a barcode into a recognition area of a barcode recognition device.

Yet another aspect of the present disclosure is to provide a guidance robot in which an insertion hole through which an object to be recognized is inserted into a barcode recognition device may be covered.

Yet another aspect of the present disclosure is to provide a guidance robot in which when an object including a barcode is inserted into a barcode recognition device, the object may be presented from being separated to the outside.

Yet another aspect of the present disclosure is to provide a guidance robot in which different objects including barcodes may be seated on predetermined positions of a barcode recognition device.

A guidance robot according to an embodiment of the present disclosure may include a bottom cover having wheels and motors therein, a middle cover located above the bottom cover and having a sensor for autonomous driving therein, a display unit coupled to the middle cover, a top cover located above the middle cover and provided to be rotatable, and a barcode reader located inside the top cover or the middle cover and configured to a barcode included in an object to be recognized.

At this time, the object to be recognized may be recognized after being inserted into the barcode reader through an insertion hole formed in the display unit. Thus, a recognition distance between the object to be recognized and a barcode recognition device may be sufficiently secured, and an insertion hole through which the object to be recognized may be covered by the display unit. Accordingly, an outer appearance looks beautiful.

Further, according to the present disclosure, a guide groove configured to guide the insertion of the object to be recognized into the barcode reader may be formed in the barcode reader, and the guide groove may be arranged to face the insertion hole, so that an object including a barcode may be easily inserted into a recognition area of the barcode recognition device.

Further, according to the present disclosure, a support plate configured to support the barcode reader may be arranged inside the middle cover, and an opening in which a portion of the barcode reader is located may be formed in the support plate. At this time, the barcode reader may be coupled to a portion of the support plate, which corresponds to an edge of the opening, through a connection member, so that an installation space of the barcode reader may be maximally secured.

Further, according to the present disclose, the barcode reader may include a seating part on which the object to be recognized is seated, a mirror arranged on an upper side of the seating part, and a sensor mounted part on which a sensor facing the mirror is mounted. At this time, a guide part having the guide groove configured to guide the insertion of the object to be recognized may be located on one side of an edge of the seating part, and the guide part may be arranged to face the insertion hole formed in the display unit.

Further, the barcode reader may further include a stopper configured to restrain an insertion depth of the object to be recognized, wherein the stopper is arranged on the other side of the edge of the seating part to face the guide part, so that the object including a barcode may be presented from escaping to the outside when being inserted into the barcode recognition device.

Further, according to the present disclosure, the barcode reader may further include a first mirror support part configured to support one side of the mirror, and a second mirror support part configured to support the other side of the mirror, wherein the first mirror support part is located between one side of the guide part and one side of the stopper, and the second mirror support part is located between the other side of the guide part and the other side of the stopper.

At this time, the second mirror support part may be formed to be higher than the first mirror support part, so that the mirror may be inclined at a specific angle. Further, a through-hole through which a detection signal output from the sensor passes may be formed in the second mirror support part, so that the detection signal output from the sensor may recognize a barcode of the object to be recognized through the mirror.

A guidance robot according to an embodiment of the present disclosure may include a head, and a barcode reader installed in the head, and having a first guide groove depressed such that an object including a barcode is inserted into the first guide groove, and a second guide groove further depressed from the first guide groove by a predetermined depth, so that the object including a barcode may be recognized, and different objects including barcodes may be seated on a predetermined position of the barcode reader.

Further, according to the present disclosure, the barcode reader may include a body part having the first guide groove formed therein, and a sensor mounted part having the second guide groove formed therein, and coupled such that the second guide groove communicates with the first guide groove, so that the object including a barcode may be prevented from escaping to the outside when being inserted into the first guide groove.

Further, according to the present disclosure, the barcode reader may include a guide part that is hollow to define the first guide groove, and an extension extending upwards by cutting a portion of an upper surface of the guide part, and having an inclined surface on one side of the extension. Further, the mirror may be arranged on the inclined surface, and the sensor mounted part may include an image sensor arranged to face the mirror. Accordingly, a recognition distance between the object including a barcode and a barcode recognition device may be secured inside a narrow internal space.

Further, according to the present disclosure, an insertion hole arranged to face the first guide groove of the body part may be formed in the display unit. Thus, the object including a barcode may be easily inserted into the first guide groove of the barcode reader through the insertion hole. It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

This application relates to U.S. application Ser. No. 15/853,409, and U.S. application Ser. No. 15/853,587, both filed on Dec. 22, 2017, which are hereby incorporated by reference in their entirety. Further, one of ordinary skill in the art will recognize that features disclosed in these above-noted applications may be combined in any combination with features disclosed herein.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A guidance robot comprising:
   a bottom section having wheels and a motor to rotate at least one wheel;
   a middle section located above the bottom section and having at least one sensor for autonomous movement;
   a display unit coupled to the middle section;
   a top section located above the middle section and configured to be rotatable relative to the middle section; and
   a reader located inside the top section or the middle section and configured to recognize a readable code included in an object,
   wherein the object having the readable code is inserted into the reader through an insertion hole formed in the display unit.

2. The guidance robot of claim 1, wherein an opening is provided on an outer peripheral surface of the middle section to face the insertion hole.

3. The guidance robot of claim 2, wherein the reader comprises:
   a seating section on which the object is to be laid;
   a mirror arranged above the seating section; and
   a sensor mount which is coupled to the seating section and on which a sensor facing the mirror is mounted.

4. The guidance robot of claim 3, wherein a guide having a guide groove configured to guide an insertion of the object is located on one side of an edge of the seating section, and
   wherein the guide groove is arranged to face the insertion hole formed in the display unit.

5. The guidance robot of claim 4, further comprising a stopper configured to limit an insertion depth of the object, wherein the stopper is arranged on the other side of the edge of the seating section to face the guide.

6. The guidance robot of claim 5, further comprising:
   a first mirror support configured to support one side of the mirror; and
   a second mirror support configured to support the other side of the mirror,
   wherein the first mirror support is located between one side of the guide and one side of the stopper, and the second mirror support is located between the other side of the guide part and the other side of the stopper.

7. The guidance robot of claim 6, wherein the second mirror support is formed to have a height greater than the first mirror support.

8. The guidance robot of claim 7, wherein a window through which a light output from the sensor passes is formed in the second mirror support.

9. The guidance robot of claim 8, wherein the sensor mount includes an inclined surface, on which the sensor is seated, such that the light output from the sensor is emitted in an inclined upward direction to the mirror.

10. The guidance robot of claim 1, wherein the reader includes a guide groove to guide the object such that the object is guided into the reader, and the guide groove is arranged to face the insertion hole.

11. The guidance robot of claim 1, wherein a support plate supporting the reader is arranged inside the middle section, and an opening in which a portion of the reader is located is formed in the support plate.

12. The guidance robot of claim 11, wherein the reader is coupled to the portion of the support plate at an edge of the opening through at least one connection plate.

13. The guidance robot of claim 12, wherein the opening comprises:
    a first opening, wherein the portion of the reader, on which the object to be recognized is seated, is located; and
    a second opening of a different size than the first opening adjacent to the first opening, and in which a sensing portion of the reader is located.

14. The guidance robot of claim 1, wherein the readable code includes at least one of a bar code or a quick response (QR) code.

15. A guidance robot comprising:
    a drive section having wheels and motors to rotate at least one wheel;
    a body located above the drive section and having a sensor and a substrate for autonomous movement;
    a display unit mounted to the body;
    a head located above the body; and
    a reader installed in the head and having a first guide groove recessed such that an object having a readable code is inserted into the first guide groove, and a second guide groove further recessed from the first guide groove by a predetermined depth,
    wherein the reader includes:
      a body section in which the first guide groove is formed; and
      a sensor mount in which the second guide groove is formed, to communicate with the first guide groove.

16. The guidance robot of claim 15, wherein the body section comprises:
    a guide which is hollow to define the first guide groove; and
    an extension extending upwards from an upper surface of the guide, and having an inclined surface on one side of the extension.

17. The guidance robot of claim 16, wherein the extension includes a mirror arranged on the inclined surface.

18. The guidance robot of claim 17, wherein the sensor mount includes an image sensor arranged to face the mirror.

19. The guidance robot of claim 15, wherein the second guide groove has a smaller width than the first guide groove.

20. The guidance robot of claim 15, wherein the second guide groove includes an inclined surface directed downwards as the inclined surface extends in a depth direction.

* * * * *